(12) United States Patent
Hadzic et al.

(10) Patent No.: US 12,240,989 B2
(45) Date of Patent: Mar. 4, 2025

(54) ORGANOMODIFIED METAL OXIDE OR METALLOID OXIDE POLYMER FILM

(71) Applicant: BASF SE, Ludwigshafen am Rhein (DE)

(72) Inventors: Admir Hadzic, Oulu (FI); Ari Karkkainen, Oulu (FI); Sami Pirinen, Oulu (FI); Milja Hannu-Kuure, Oulu (FI); Jarkko Leivo, Oulu (FI); Rauna-Leena Kuvaja, Oulu (FI); Graeme Gordon, Duntrune (GB); Toshikage Asakura, Amagasaki (JP); Neil Gregory Pschirer, Ludwigshafen (DE); Hiroshi Yamamoto, Amagasaki (JP)

(73) Assignee: BASF SE, Ludwigshafen am Rhein (DE)

( * ) Notice: Subject to any disclaimer, the term of this patent is extended or adjusted under 35 U.S.C. 154(b) by 1039 days.

(21) Appl. No.: 16/971,877

(22) PCT Filed: Feb. 21, 2019

(86) PCT No.: PCT/EP2019/054308
§ 371 (c)(1),
(2) Date: Aug. 21, 2020

(87) PCT Pub. No.: WO2019/162374
PCT Pub. Date: Aug. 29, 2019

(65) Prior Publication Data
US 2020/0392368 A1    Dec. 17, 2020

(30) Foreign Application Priority Data
Feb. 23, 2018    (EP) .................................... 18158357

(51) Int. Cl.
C09D 133/14 (2006.01)
C03C 17/25 (2006.01)
(Continued)

(52) U.S. Cl.
CPC .......... *C09D 133/14* (2013.01); *C03C 17/256* (2013.01); *C08F 20/28* (2013.01);
(Continued)

(58) Field of Classification Search
CPC .......................... C03C 2218/11; C03C 17/256
See application file for complete search history.

(56) References Cited

U.S. PATENT DOCUMENTS 4,754,012 A    6/1988 Yoldas et al.
4,772,530 A    9/1988 Gottschalk et al.
(Continued)

FOREIGN PATENT DOCUMENTS

CN    87107834 A    7/1988
CN    107109085 A    8/2017
(Continued)

OTHER PUBLICATIONS

International Preliminary Report on Patentability and Written Opinion issued Aug. 27, 2020 in PCT/EP2019/054308 (English Translation only), 6 pages.
(Continued)

*Primary Examiner* — Nathan T Leong
(74) *Attorney, Agent, or Firm* — Faegre Drinker Biddle & Reath LLP

(57) ABSTRACT

The present invention relates to a process for preparing a thin film on a substrate comprising the steps of preparing two precursor compositions comprising metalloid compounds and combining them thereafter whereby one precursor composition is hydrolyzed prior to combination. The present invention is further related to a multilayer structure
(Continued)

and an article comprising the thin film obtainable by the process, a composition comprising the precursor compositions, a kit-of-parts comprising the precursor compositions and the use of the composition and the kit-of-parts for preparing a thin film on a substrate.

10 Claims, 6 Drawing Sheets

(51) Int. Cl.
*C08F 20/28* (2006.01)
*C09D 4/00* (2006.01)

(52) U.S. Cl.
CPC .......... *C09D 4/00* (2013.01); *C03C 2217/212* (2013.01); *C03C 2218/11* (2013.01)

(56) References Cited

U.S. PATENT DOCUMENTS

| | | |
|---|---|---|
| 4,950,581 A | 8/1990 | Koike et al. |
| 6,218,494 B1 | 4/2001 | White, Jr. et al. |
| 2014/0147684 A1 | 5/2014 | Kwak et al. |

FOREIGN PATENT DOCUMENTS

| | | |
|---|---|---|
| EP | 0 126 541 A1 | 11/1984 |
| EP | 0 263 428 A2 | 4/1988 |
| EP | 0 775 706 A2 | 5/1997 |
| EP | 0263428 * | 7/1997 |
| EP | 1 761 462 B1 | 4/2013 |
| GB | 2 304 472 A | 3/1997 |
| GB | 2 307 473 A | 5/1997 |
| GB | 2 307 474 A | 5/1997 |
| JP | 63-123838 A | 5/1988 |
| JP | 2000-119586 A | 4/2000 |
| JP | 2010-15025 A | 1/2010 |
| JP | 2010-49238 A | 3/2010 |
| WO | WO 2005/080337 A1 | 9/2005 |
| WO | WO 2006/134218 A1 | 12/2006 |
| WO | WO 2007/062963 A1 | 6/2007 |
| WO | WO 2007/071497 A1 | 6/2007 |
| WO | WO 2007/071797 A1 | 6/2007 |
| WO | WO 2008/078678 A1 | 7/2008 |
| WO | 2019/230283 A1 | 12/2019 |

OTHER PUBLICATIONS

International Search Report issued Apr. 30, 2019 in PCT/EP2019/054308 filed Feb. 21, 2019.
Ying et al., "Application of Lightweight Carbon Materials", National Defense Industry Press, Nov. 2013, pp. 41-43.

* cited by examiner

ORGANOMODIFIED METAL OXIDE OR METALLOID OXIDE POLYMER FILM

The present invention relates to a process for preparing organomodified metal oxide or metalloid oxide polymer film, a coating composition, an article comprising the coating and the use for the coating composition for preparing a coating.

As known in the art, organo-modified silicon dioxides can be employed for forming optically transparent and electrically well insulating layers by using them as organo-siloxane polymers, also known as "sol-gel polymers". For example, in the simplest case, silicon tetraethoxide or silicon tetrachloride is hydrolyzed and condensation polymerisation of the hydrolysed monomer results in a siloxane polymer that can be converted to a silicon dioxide material under thermal treatment. Furthermore, organo-siloxanes can be made lithographically patternable by attaching photo-cross-linking moieties covalently to the silicon oxide backbone. A silicon oxide material based on pure silicon dioxide or even organo-modified silicon dioxides exhibit, however, a relatively low refractive index. Refractive indices of these materials are usually not higher than 1.5 and their dielectric constants are in the range from about 4.2 to 2.5 depending on their structure and on the moieties attached to silicon.

Hybrid metal oxide materials, e.g. titanium oxide hybrid polymers, are known (EP 1 761 462 B1) and can be obtained by hydrolysis of metal halogenide or alkoxide precursors in solution. The obtained formulations can be applied by e.g. spin-on processing. The resulting films are suitable for further processing via lithography, embossing, roll-to-roll printing/coating or gravure printing/coating. When organic monomers (e.g. methacrylates) are present in the formulation, the material is suitable as negative type resist in the lithographic process as the unexposed parts can be washed away with an alkaline developer solution after UV irradiation. Processing temperatures range from 350-500° C.

WO 2006/134218 A1 discloses an optical device structure comprised of a photonic crystal coated with alternating layers of high and low refractive index wherein the coatings can be obtained from reactive metal oxide precursors such as halogenides or alkoxylates of Ge, Ti, Sn, Sb, Ta, Hf, Zr and Si. The layers are deposited from the liquid phase and can be patterned in lithographic processes. Processing temperatures between 250-400° C. are disclosed.

Disadvantages of the aforementioned procedures are large amounts of HCl that are freed during the formulation process which need to be neutralized, removed and disposed of.

Furthermore, processing temperatures are high, making the underneath material layers susceptible to thermal damaging and limiting the application of the polymers as films on materials capable of withstanding the high processing temperature. Thus, a composition that is processable at temperatures below 400° C. and preferably even below 100° C. is desirable. Moreover, the material should be suitable for thermal curing only, combined thermal and UV curing or UV curing only. UV curing only systems are usually solvent-free or nearly solvent-free and this means, that we need to introduce material platform, which is essentially solvent free. In such systems no damage by organic solvents to the underneath device layers can occur and minimal or even no volatiles can be released during the cure process.

Furthermore, the refractive index should be higher than 1.5 at 632 nm.

It has been found that the above objectives can be achieved by the following process provided by the present invention.

A process for preparing a thin film on a substrate, the process comprising the steps of
a) preparing a first precursor composition (FPC) in a first vessel, the preparation comprising the following steps:
   a1) providing one or more metal or metalloid compound(s) according to the following formula (I)

   $$M^1(OR^1)_n R^2_m \quad (I)$$

wherein
   $M^1$ is a metal or metalloid with a valence z
   $R^1$ is each independently selected from a $C_1$ to $C_{10}$ organyl or organoheteryl group;
   $R^2$ is each independently selected from a $C_1$ to $C_{20}$ organyl or organoheteryl group
   n is 1 to z
   m is z−1 to 0
   n+m is z
   a2) at least partial hydrolysation of the $M^1(OR^1)$-moieties and polymerizing the metal or metalloid compound according to formula (I)
b) preparing a second precursor composition (SPC) in a second vessel, the preparation comprising the following steps:
   b1a) providing a metal or metalloid compound according to the following formula (II)

   $$M^2(OR^3)_o \quad (II)$$

wherein
   $M^2$ is a metal or metalloid with a valence y, whereby $M^1$ and $M^2$ are based on different elements of the periodic table;
   $R^3$ is each independently selected from a $C_1$ to $C_{10}$ organyl or organoheteryl group;
   o is y
   b2a) optionally reacting the metal or metalloid compound according to formula (II) with a ligand (L) different from $(OR^3)$;
   or
   b1b) directly providing the reaction product of step b2a);
c) mixing the first precursor composition (FPC) with the second precursor composition (SPC);
   c1) optionally, reacting the product of step c) with $Si(R^{23})_3X$, whereby
   $R^{23}$ is $C_1$-$C_3$ alkyl group
   X represents Cl or $OR^{24}$;
   $R^{24}$ is $C_1$-$C_3$ alkyl group
d) forming a thin layer on the substrate;
e) optionally partial or complete removal of solvent, if present, after step d);
f) curing the intermediate product obtained in step e), if present, or step d), if step e) is not present
whereby, optionally a (meth)acrylate ester (ME) is added
during the preparation of the first precursor composition (FPC),
during the preparation of the second precursor composition (SPC) and/or
during step c) or after step c) before step d) is effected.

The thus obtained films provide higher refractive index and can be applied at low temperature. Moreover, as no particles are needed for or caused during the preparation of the thin film, defects caused by particles will not occur in the inventive thin film. The inventive thin films have combined out-coupling and thin film encapsulation layer and planarization capabilities. Planarization and particle free are very important for higher resolution displays with smaller and smaller pixel dimensions and density. Furthermore, the film is stable over long period and provides an improved combination of transmission and refractive index. Moreover, the composition can be used in dilution, e.g. for ink-jet printing, slot coating or as solvent-free system. In both cases it can be applied by conventional methods (such as slot-coating and ink-jet printing). The inventive films could be used together with scatter particles, if needed, e.g. for OLED lighting where the layer can be used as a scatter layer. However, no or only minimal particle defects will arise therefrom.

The following definitions apply in the present invention unless explicitly mentioned to the contrary.

An organyl group is an organic substituent group, having one free valence at a carbon atom.

An organoheteryl group is an organic substituent group, having one free valence at an atom different from a carbon atom.

First Precursor Composition

As outlined above, the first precursor composition (FPC) is prepared in a first vessel, the preparation comprising the following steps:

a1) providing one or more metal or metalloid compound(s) according to the following formula (I)

$$M^1(OR^1)_n R^2_m \qquad (I)$$

wherein
$M^1$ is a metal or metalloid with a valence z
$R^1$ is each independently selected from a $C_1$ to $C_{10}$ organyl or organoheteryl group;
$R^2$ is each independently selected from a $C_1$ to $C_{20}$ organyl or organoheteryl group
n is 1 to z
m is z−1 to 0
n+m is z a2) at least partial hydrolysation of the $M^1(OR^1)$-moieties and polymerizing the one or more metal or metalloid compound according to formula (I);

In step a1) up to five different metal or metalloid compounds according to the formula (I) may be provided, usually, not more than three different metal or metalloid compounds according to the formula (I) are provided.

Preferably, the one or more metal or metalloid compound(s) according to formula (I) is/are free from fluorine. Thus, in case more than one metal or metalloid compound(s) according to formula (I) are provided they are preferably all free from fluorine. More preferably no fluorine containing compound except optionally fluorine containing solvents is/are present during the preparation of the first precursor composition (FPC) before step c) is accomplished, even more preferably, in case solvents are present, the amount of fluorine-containing solvents based on the total weight of the solvents present is equal or less than 75 weight % is present and most preferably no fluorine containing compound including fluorine containing solvents are present during the preparation of the first precursor composition (FPC) before step c) is accomplished.

$M^1$ is preferably selected from Si, Ge, Sb, Ti, Zr, Al, Sn, W, Se, Cr, Ag or Ni, more preferably from Si, Ti, Zr, Ge, Sb, and most preferably $M^1$ is Si.

$R^1$ is each independently selected from a $C_1$ to $C_{10}$ organyl or organoheteryl group.

In case heteroatoms are present in the organyl group of $R^1$ they are preferably selected from N, O, P, S or Si, more preferably selected from N and O.

Preferred groups $OR^1$ are alkoxy, acyloxy and aryloxy groups.

The heteroatom of the organoheteryl group of $R^1$ bound to the oxygen atom bound to $M^1$ is usually different from O.

The heteroatom(s) present in the organoheteryl group of $R^1$ are preferably selected from N, O, P or S, more preferably selected from N and O.

The total number of heteroatoms, if present, in $R^1$ is usually not more than five, preferably not more than three.

Preferably $R^1$ is a $C_1$ to $C_{10}$ organyl group containing not more than three heteroatoms, more preferably $R^1$ is a $C_1$ to $C_{10}$ hydrocarbyl group, even more preferably a $C_1$ to $C_{10}$ linear, branched or cyclic alkyl group.

Preferably the total number of carbon atoms present in $R^1$ according to any one of the above variants is 1 to 6, more preferably 1 to 4.

$R^2$ is each independently selected from a $C_1$ to $C_{20}$ organyl or organoheteryl group In case heteroatoms are present in the organyl group of $R^2$ they are preferably selected from N, O, P, S or Si, more preferably selected from N and O.

The heteroatom of the organoheteryl group of $R^2$ bound to $M^1$ is usually different from O.

The heteroatom(s) present in the organoheteryl group of $R^2$ are preferably selected from N, O, P or S, more preferably selected from N and O.

The total number of heteroatoms, if present, in $R^2$ is usually not more than eight, preferably not more than five and most preferably not more than three.

Preferably $R^2$ is a $C_1$ to $C_{20}$ organyl group containing not more than three heteroatoms, more preferably, $R^2$ is selected from $C_1$ to $C_{20}$ hydrocarbyl groups, $C_1$ to $C_{20}$ mercaptohydrocarbyl groups, $C_1$ to $C_{20}$ hydrocarbyl(meth)acrylic acid ester groups and $C_1$ to $C_{20}$ hydrocarbylglycidylethers, more preferably $C_1$ to $C_{20}$ alkyl groups, $C_1$ to $C_{20}$ mercaptoalkyl groups, $C_1$ to $C_{20}$ alkyl(meth)acrylic acid ester groups and $C_1$ to $C_{20}$ alkylglycidylethers. In the afore-mentioned variants the number of carbon atoms given denote the total number of carbon atoms present in $R^2$. For example, in case of $R^2$ being a 3-methacryloxypropyl-group the number of carbon atoms is seven.

Preferably, the total number of carbon atoms present in $R^2$ according to any one of the above variants is 1 to 15, more preferably 1 to 10 and most preferably 1 to 7.

Preferably n is at least 2. In case the valence z of the metal or metalloid $M^1$ is 4 or more, n is preferably at least 3.

Preferably, in at least one compound according to formula (I) each $R^1$ and $R^2$, if present, are the same. Hence, $R^1$ and $R^2$ may still be different.

More preferably, in each compound according to formula (I) each respective $R^1$ and $R^2$, if present, are the same. Thus, in case more than one compound according to formula (I) is used $R^1$ of one compound according to formula (I) may still be different from $R^1$ of another compound according to formula (I).

In case more than one compound according to formula (I) is provided in step a1), preferably in at least one compound according to formula (I) n=z whereas in at least one other compound according to formula (I) n<z.

Suitable compounds according to formula (I) are, for example triethoxysilane, tetraethoxysilane, dimethyldimethoxysilane, diethyldimethoxysilane, dimethyldiethoxysilane, diethyldiethoxysilane, methyltriethoxysilane, ethyltriethoxysilane, n-butyltriethoxysilane, methyldiethoxyvinylsilane, phenyltrimethoxysilane, phenantrene-9-triethoxysilane, vinyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, aminopropyltrimethoxysilane, n-hexyltrimethoxysilane, propyltrimethoxysilane, methacryloxypropyltrimethoxiysilane, methacryloxypropylmethyldimethoxysilane, methacryloxypropylmethyldiethoxysilane, mercaptpropyltrimethoxysilane, mercaptpropylmethyldimethoxysilane, acryloxypropyltrimethoxysilane, allyltrimethoxysilane, epoxycyclohexylethyltrimethoxysilane, methyltrimethoxysilane (MTMOS), methyltriethoxysilane (MTEOS), dimethyldiethoxysilane (DMDEOS), phenyl triethoxysilane (PTEOS), dimethyldimethoxysilane and phenyltrimethoxysilane, methoxytrimethylsilane, ethoxytrimethylsilane, n-propoxytrimethylsilane, methoxydimethylethylsilane, ethoxydimethylethylsilane, n-propoxydimethylethylsilane, methoxydimethylvinylsilane, ethoxydimethylvinylsilane, n-propoxydimethylvinylsilane, trimethoxymethylsilane and triethoxymethylsilane, and mixtures thereof.

In step a2) a compound according to the following formula (III) may be present

   (III)

wherein $M^3$, $M^{3'}$ are the same or different and are each independently selected from a metal or metalloid with a valence x;

Y is a divalent linking group;

$R^6$, $R^{6'}$ are the same or different and are each independently selected from a $C_1$ to $C_{10}$ organyl or organoheteryl group;

$R^7$, $R^{7'}$ are the same or different and are each independently selected from a $C_1$ to $C_{20}$ organyl or organoheteryl group;

s, s' are the same or different and are each independently selected from 1 to x−1;

t, t' are the same or different and are each independently selected from is x−2 to 0;

s+t is x−1; and s'+t' is x−1.

In case in step a2) a compound according to formula (III) is present, this compound is preferably provided in a further step a1a) which may be accomplished before, after or together with step a1).

$M^3$ and $M^{3'}$ are preferably selected from Si, Ge, Sb, Ti, Zr, Al, Sn, W, Se, Cr, Ag or Ni, more preferably from Si, Ti, Zr, Ge, Sb, and most preferably are Si.

Preferably $M^3$ and $M^{3'}$ are the same.

$R^6$, $R^{6'}$ are the same or different and are each independently selected from a $C_1$ to $C_{10}$ organyl or organoheteryl group.

In case heteroatoms are present in the organyl group of $R^6$ and/or $R^{6'}$ they are preferably selected from N, O, P, S or Si, more preferably selected from N and O.

Preferred groups $OR^6$ and/or $OR^{6'}$ are alkoxy, acyloxy and aryloxy groups.

The heteroatom of the organoheteryl group of $R^6$ and/or $R^{6'}$ bound to the oxygen atom bound to $M^3$ or $M^{3'}$, respectively, is usually different from O.

The heteroatom(s) present in the organoheteryl group of $R^6$ and/or $R^{6'}$ are preferably selected from N, O, P or S, more preferably selected from N and O.

The total number of heteroatoms, if present, in $R^6$ and/or $R^{6'}$ is usually not more than five, preferably not more than three.

Preferably $R^6$ and/or $R^{6'}$ is a $C_1$ to $C_{10}$ organyl group containing not more than three heteroatoms, more preferably $R^6$ and/or $R^{6'}$ is a $C_1$ to $C_{10}$ hydrocarbyl group, even more preferably a $C_1$ to $C_{10}$ linear, branched or cyclic alkyl group.

Preferably the total number of carbon atoms present in $R^6$ and/or $R^{6'}$ according to any one of the above variants is 1 to 6, more preferably 1 to 4.

Preferably $R^6$ and $R^{6'}$ are the same.

$R^7$, $R^{7'}$ is each independently selected from a $C_1$ to $C_{20}$ organyl or organoheteryl group.

In case heteroatoms are present in the organyl group of $R^7$ and/or $R^{7'}$ they are preferably selected from N, O, P, S or Si, more preferably selected from N and O.

The heteroatom of the organoheteryl group of $R^7$ and/or $R^{7'}$ bound to $M^3$ or $M^{3'}$, respectively, is usually different from O.

The heteroatom(s) present in the organoheteryl group of $R^7$ and/or $R^{7'}$ are preferably selected from N, O, P or S, more preferably selected from N and O.

The total number of heteroatoms, if present, in $R^7$ and/or $R^{7'}$ is usually not more than eight, preferably not more than five and most preferably not more than three.

Preferably $R^7$ and/or $R^{7'}$ is a $C_1$ to $C_{20}$ organyl group containing not more than three heteroatoms, more preferably $R^7$ and/or $R^{7'}$ is a $C_1$ to $C_{20}$ hydrocarbyl group, even more preferably a $C_1$ to $C_{20}$ linear, branched or cyclic alkyl group.

Preferably the total number of carbon atoms present in $R^7$ and/or $R^{7'}$ according to any one of the above variants is 1 to 15, more preferably 1 to 10 and most preferably 1 to 6.

Preferably $R^7$ and $R^{7'}$ are the same.

Preferably s and/or s' is at least 2. In case the valence z of the metal or metalloid $M^3$ and/or $M^{3'}$ is 4 or more, s and/or s' is preferably at least 3.

Suitable compounds according to formula (III) are, for example 1,2-bis(trimethoxysilyl)methane, 1,2-bis(triethoxysilyl)methane, 1,2-bis(trimethoxysilyl)ethane, 1,2-bis(triethoxysilyl)ethane, 1-(dimethoxymethylsilyl)-1-(trimethoxysilyl)methane, 1-(diethoxymethylsilyl)-1-(triethoxysilyl)methane, 1-(trimethoxymethylsilyl)-2-(dimethoxysilyl)ethane, 1-(dimethoxymethylsilyl)-2-(trimethoxysilyl)ethane, 1-(diethoxymethylsilyl)-2-(triethoxysilyl)ethane, bis(dimethoxymethylsilyl)methane, bis(diethoxymethylsilyl)methane, 1,2-bis(dichloromethylsilyl)ethane, 1,2-bis(trichlorosilyl)ethane, 1,2-bis(dimethoxymethylsilyl)ethane, 1,2-bis(diethoxymethylsilyl)ethane, 1,2-bis(trimethoxysilyl)benzene, 1,2-bis(triethoxysilyl)benzene, 1,3-bis(trimethoxysilyl)benzene, 1,3-bis(triethoxysilyl)benzene, 1,4-bis(trimethoxysilyl)benzene, 1,4-bis(triethoxysilyl)benzene, 4,4'-Bis(triethoxysilyl)-1,1'-biphenyl, 1,4-Bis(triethoxysilyl)benzene, and 1,3-Bis(triethoxysilyl)benzene and combinations thereof.

The at least partial hydrolysation in step a2) is preferably accomplished under acidic or basic conditions, usually using a catalyst, such as sulfuric acid, hydrochloric acid, nitric acid, acetic acid, citric acid, formic acid, triflic acid, perfluorobutyric acid or another mineral or organic acid or a base, more preferably a mineral acid such as $HNO_3$.

In case an acid is used the concentration of the acid is preferably 0.01 mol/l to 1.0 mol/l, more preferably 0.05 mol/l to 0.2 mol/l. The acid is usually dissolved in water or in a mixture of water and an organic solvent, e.g. an alcohol, a ketone, preferably a ketone, such as acetone.

The at least partial hydrolysation in step a2) is preferably accomplished at a temperature between 50 and 150° C. but not above the boiling point of the solvent or solvent mixture present in step a2).

The at least partial hydrolysation in step a2) is preferably accomplished for 1.0 to 10 hours, preferably 2.5 to 7.5 hours.

During the at least partial hydrolysation in step a2) a basic substance, e.g. an amine, such as a $C_1$ to $C_4$-trialkylamine may be added.

Preferably the molecular weight of the product of step a2) is 250 g/mol to 6000 g/mol, more preferably 500 g/mol to 1500 g/mol.

During preparation of the first precursor composition, one or more additional organic solvents may be used.

Preferably, the solvent(s) is/are selected from alcohols, preferably containing 1 to 6 carbon atoms, e.g. methanol, ethanol, propanol, butanol, ether alcohols such as propyleneglycolmonomethylether, ketones, such as acetone, esters, such as propyleneglycolmonomethyletheracetate, ethyl acetate, methylformate and ethers, such as diethyl ether, THF, preferably alcohols, ether alcohols or ketones A mixture of up to five organic solvents may be used, preferably not more than three organic solvents are used and most preferable only one organic solvent is used.

Preferably, as outlined above, the organic solvent(s) used during the preparation of the first precursor composition is fluorine free.

More preferably, after step a2) an additional step a3) is accomplished.

a3) in case a solvent is present in step a2) exchanging the solvent or solvents used in step a2) by one or more organic solvents as outlined above,
or
in case a solvent is present in step a2) removing the solvent.

In case the at least partial hydrolysation in step a2) is accomplished using a catalyst, in each variant of step a3) the catalyst may and preferably is removed.

Exchanging the solvents denotes that the solvent or solvent mixture present before and after the solvent exchange are different. Usually, at least the water usually present in the at least partial hydrolysation in step a2) is removed by the solvent exchange.

Thus, for example, the water and optionally organic solvent, e.g. ketone, used in the at least partial hydrolysation in step a2) is/are replaced by a different organic solvent, e.g. alcohol, such as $C_1$ to $C_4$ alcohol.

More preferably, the solvent is removed in step a3) and, optionally, in case the at least partial hydrolysation in step a2) is accomplished using a catalyst, in each variant of step a3) the catalyst is removed.

Second Precursor Composition

As outlined above, the second precursor composition (SPC) is prepared in a second vessel, the preparation comprising the following steps:

b1a) providing a metal or metalloid compound according to the following formula (II)

$$M^2(OR^3)_o \qquad (II)$$

wherein
$M^2$ is a metal or metalloid with a valence y, whereby $M^1$ and $M^2$ are based on different elements of the periodic table;
$R^3$ is each independently selected from a $C_1$ to $C_{10}$ organyl or organoheteryl group;

o is y b2a) optionally reacting the metal or metalloid compound according to formula (II) with a ligand (L) different from $(OR^3)$;
or
b1b) directly providing the reaction product of step b2a);

Thus, the metal or metalloid compound according to formula (II) can be used but is preferably reacted with a ligand (L) different from $(OR^3)$ prior to step c).

$R^3$ is each independently selected from a $C_1$ to $C_{20}$ organyl or organoheteryl group.

In case heteroatoms are present in the organyl group of $R^3$ they are preferably selected from N, O, P, S or Si, more preferably selected from N and O.

The heteroatom of the organoheteryl group of $R^3$ bound to $M^2$ is usually different from O.

The heteroatom(s) present in the organoheteryl group of $R^3$ are preferably selected from N, O, P or S, more preferably selected from N and O.

The total number of heteroatoms, if present, in $R^3$ is usually not more than eight, preferably not more than five and most preferably not more than three.

Preferably $R^3$ is a $C_1$ to $C_{20}$ organyl group containing not more than three heteroatoms, more preferably $R^3$ is a $C_1$ to $C_{20}$ hydrocarbyl group, even more preferably a $C_1$ to $C_{20}$ linear, branched or cyclic alkyl group.

Preferably the total number of carbon atoms present in $R^3$ according to any one of the above variants is 1 to 15, more preferably 1 to 10 and most preferably 1 to 6.

Preferably, each $R^3$ present are the same.

$M^2$ is preferably selected from Si, Ge, Sb, Ti, Zr, Al, Sn, W, Se, Cr, Ag or Ni, more preferably from Si, Ti, Zr, Ge, Sb, and most preferably $M^2$ is Ti and/or Zr.

Suitable compounds according to formula (II) are, for example zirconium(IV) and titanium(IV) compounds of $C_1$ to $C_{10}$ alcohols as $OR^3$ with $R^3$ being a linear, branched or cyclic aliphatic hydrocarbon such as zirconium tetramethoxide, zirconium tetraethoxide, zirconium tetrapropoxide, zirconium tetrabutoxide, zirconium acetate, zirconium acetylacetonate, titanium tetramethoxide, titanium tetraethoxide, titanium tetrapropoxide, titanium acetate, titanium tetrabutoxide.

The ligand (L) different from $(OR^3)$ is preferably a ligand which coordinating atoms are selected from O, N and S, preferably selected from O and N and most preferably are O.

The ligand (L) different from $(OR^3)$ can be any compound selected from the group consisting of organic acids, acid anhydrides, alkoxides, ketones, beta-diketones, acetyl acetones, benzyl acetones, aryl oxides, beta-keto-esters, alkanol amines, glygols, oximes, alkyl hydroxyl amines, beta-keto-amines, Shiff-bases, thiols and aldehydes. Therefore, examples of suitable organic compounds include, but are not limited to, acetic acid, acrylic acid, metacrylic acid, trifluoroacetic acid. Further examples are formed by ketones, such as acetone, and beta-diketone, and aldehydes.

Usually the ligand (L) has a molecular weight of not more than 1000 g/mol, more preferably not more than 750 g/mol and most preferably not more than 500 g/mol.

Suitable ligands (L) different from $(OR^3)$ are, for example the compounds according to formula (III) as defined above or compounds according to the following formula (IV), (IV'), (VI") and (IV''')

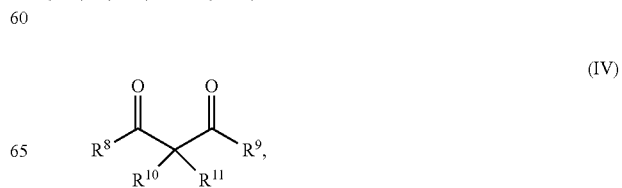

-continued $$HO\diagdown_{R^{20}}\diagup OH, \quad (IV')$$

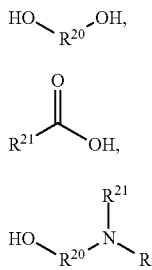
(IV'')

$$HO\diagdown_{R^{20}}\diagdown\underset{|}{\overset{R^{21}}{N}}\diagdown_{R^{21}} \quad (IV''')$$

wherein
$R^8$, $R^9$ are the same or different and are each independently selected from $C_1$ to $C_{10}$ organyl groups or $C_1$ to $C_{10}$ organoheteryl groups, preferably $C_1$ to $C_{10}$ hydrocarbyl, $C_1$ to $C_{10}$ hydrocarbyloxy groups, more preferably, linear, branched or cyclic $C_1$ to $C_{10}$ alkyl groups, $C_6$ to $C_{10}$ aryl groups, $C_1$ to $C_{10}$ alkoxy, $C_6$ to $C_{10}$ aryloxy groups and $C_7$ to $C_{10}$ alkylaryloxy groups and most preferably linear, branched or cyclic $C_1$ to $C_{10}$ alkyl groups and $C_1$ to $C_{10}$ alkoxy groups;

$R^{10}$, $R^{11}$ are the same or different and are each independently selected from hydrogen, $C_1$ to $C_4$ organyl groups or $C_1$ to $C_4$ organoheteryl groups, more preferably from hydrogen and $C_1$ to $C_4$ hydrocarbyl groups and mot preferably from hydrogen and $C_1$ to $C_4$ alkyl groups, e.g. hydrogen.

$R_{20}$ is a $C_2$-$C_6$ alkylene group, which can be interrupted by O or $NR^{22}$;

$R^{21}$ is independently selected from hydrogen or a $C_1$-$C_6$ hydrocarbyl group, preferably $C_1$-$C_6$ alkyl group;

$R^{22}$ are hydrogen, methyl group, or hydroxyethyl group

Preferably, the ligand (L) different from $(OR^3)$ is a bi- or multidentate ligand (L), more preferably is a bidentate ligand, e.g. selected from formulas (IV), (IV') and (IV''') above, preferably selected from formulas (IV) or (IV') above and most preferably from formula (IV) above.

In case heteroatoms are present in the organyl group of $R^8$, $R^9$ $R^{10}$ and $R^{11}$ they are preferably selected from N, O, P, S or Si, more preferably selected from N and O.

The heteroatom(s) present in the organoheteryl group of $R^8$, $R^9$ $R^{10}$ and $R^{11}$ are preferably selected from N, O, P or S, more preferably selected from N and O.

The total number of heteroatoms, if present, in $R^8$ and $R^9$ is usually not more than five, preferably not more than three and most preferably not more than one.

The total number of heteroatoms, if present, in $R^{10}$ and $R^{11}$ is usually not more than two, preferably not more than one.

During preparation of the second precursor composition one or more organic solvents may be used.

Preferably, the solvent(s) is/are selected from alcohols, preferably containing 1 to 6 carbon atoms, e.g. methanol, ethanol, propanol, butanol, ether alcohols such as propyleneglycolmonomethylether, ketones, such as acetone, esters, such as propyleneglycolmonomethyletheracetate, ethyl acetate, methylformate and ethers, such as diethyl ether, THF, preferably alcohols, ether alcohols or ketones A mixture of up to five organic solvents may be used, preferably not more than three organic solvents are used and most preferable only one organic solvent is used.

In case step b2a) is present, the reaction time is preferably between 1.0 hours and 10 days, more preferably between 2.5 days and 7.5 days.

In case step b2a) is present, the reaction temperature usually does not exceed 75° C., more preferably does not exceed 50° C.

More preferably, after step b1a), or if step b2a) is present after step b2a) or in case step b1b) is present, after step b1b) an additional step b3) is accomplished.

b3) in case a solvent is present in any one of the steps b1a), b2a), if present, b1b), if present exchanging the solvent or solvents present after steps b1a), b2a), if present, b1b), if present by one or more organic solvents as outlined above, or in case a solvent is present in any one of the steps b1a), b2a), if present, b1b), if present removing the solvent.

Preferably, the solvent is exchanged, more preferably, the solvent is exchanged by removing the solvent present in any one of the steps b1a), b2a), if present, b1b), if present and, adding a solvent. The solvent present before and after the solvent exchange, particularly in case the solvent is removed and new solvent is added may be the same chemical compound. This is especially preferable in case step b2a) is present.

Step c)

During step c) the first precursor composition (FPC) is combined with the second precursor composition (SPC).

Additional organic solvents may be added during step c) in order to obtain the desired final solids content.

Preferably, the solvent(s) which may be added are selected from alcohols, preferably containing 1 to 6 carbon atoms, e.g. methanol, ethanol, propanol, butanol, ether alcohols such as propyleenglycolmonomethylether, dipropylene glycol, ethylene glycol, ketones, esters, such as ethyl acetate, methylformate,ethers, propylene glycol methyl ether, particularly preferred are alcohols, preferably containing 1 to 6 carbon atoms, e.g. methanol, ethanol, propanol, ethylene glycol, propylene glycol methyl ether, or mixtures thereof, most preferred are selected from alcohols, preferably containing 1 to 6 carbon atoms, e.g. methanol, ethanol, propanol, butanol, ether alcohols such as propyleenglycol-monomethylether, dipropylene glycol, propyleneglycolmo-nomethyletheracetate, tetrahydrofurfyryl alcohol, cyclohexanone, ethylene glycol or propylene glycol methyl ether.

In step c) the weight ratio between the solids contents of the first precursor composition (FPC) and the solids content of the second precursor composition (SPC) is preferably between 10:1.0 to 1.0:2000, preferably between 5.0:1.0 to 1.0:1500.0, more preferably between 2.0:1.0 to 1.0:500.0.

It is preferred that in step c) the molar ratio between $M^1$ and $M^2$ is from 1.0:10 to 10:1.0, preferably from 1.0:10 to 1.0:1.0, more preferably from 1.0:10 to 1.0:2.0.

As outlined above, the process optionally comprises the following step c1) reacting the product of step c) with $Si(R^{23})_3X$ or $Si(R^{23})_2X_2$, whereby $R^{23}$ is $C_1$-$C_3$ alkyl group
X represents Cl or $OR^{24}$
$R^{24}$ is $C_1$-$C_3$ alkyl group.

In optional step c1) the molar ratio between the second precursor composition (SPC) and $Si(R^{23})_3X$ is preferably between 100:1.0 to 1.0:20, preferably between 10.0:1.0 to 1.0:5.0, more preferably between 5.0:1.0 to 1.0:2.0.

Reaction temperature of c1) is between 25° C. to 150° C., preferably 60° C. to 120° C. Reaction time is usually 0.1 h to 5 days, more preferably 0.5 h to 24 hours.

Furthermore, usual additives used for coating compositions for thin films may be added during step c). Such usual additives include, for example, surfactants, levelling agents, processing aids, antistatic agents, antioxidants, water and oxygen scavengers, catalysts, photoinitators or mixtures thereof. In some cases, it may be also preferable to introduce scatter particles into the thin film coating solution. Such particles usually provide additional optical effects, e.g. to meet specific requirements, such as for lighting applications. These particles can be, for example $SiO_2$, $TiO_2$, $ZrO_2$, or similar inorganic particles.

Examples for photoinitiators which may be added in step c) are radical photoinitiators, such as for example camphor quinone; benzophenone, benzophenone derivatives; ketal compounds, as for example benzildimethylketal (Omnirad 651); acetophenone, acetophenone derivatives, for example α-hydroxycycloalkyl phenyl ketones or α-hydroxyalkyl phenyl ketones, such as for example 2-hydroxy-2-methyl-1-phenyl-propanone (Omnirad 1173), 1-hydroxy-cyclohexyl-phenyl-ketone (Omnirad 184), 1-(4-dodecylbenzoyl)-1-hydroxy-1-methyl-ethane, 1-[4-isopropylbenzoyl)-1-hydroxy-1-methyl-ethane, 144-(2-hydroxyethoxy)-phenyl]-2-hydroxy-2-methyl-1-propan-1-one (Omnirad 2959); 2-hydroxy-1-{4-[4-(2-hydroxy-2-methylpropionyl)-benzyl]-phenyl}-2-methyl-propan-1-one (Omnirad 127); 2-hydroxy-1-{4-[4-(2hydroxy-2-methyl-propionyl)-phenoxy]-phenyl}-2-methyl-propan-1-one; dialkoxyacetophenones, α-hydroxy- or α-aminoacetophenones, e.g. (4-methylthiobenzoyl)-1-methyl-1-morpholinoethane (Omnirad 907), (4-morpholinobenzoyl)-1-benzyl-1-dimethylaminopropane (Omnirad 369), (4-morpholinobenzoyl)-1-(4-methylbenzyl)-1-dimethylaminopropane (Omnirad 379), (4-(2-hydroxyethyl)aminobenzoyl)-1-benzyl-1-dimethylaminopropane), (3,4-dimethoxybenzoyl)-1-benzyl-1-dimethylaminopropane; 4-aroyl-1,3-dioxolanes, benzoin alkyl ethers and benzil ketals, e.g. dimethyl benzil ketal, phenylglyoxalic esters and derivatives thereof, e.g. oxophenyl-acetic acid 2-(2-hydroxy-ethoxy)-ethyl ester, dimeric phenylglyoxalic esters, e.g. oxo-phenyl-acetic acid 1-methyl-2-[2-(2-oxo-2-phenyl-acetoxy)-propoxy]-ethyl ester (Omnirad 754); oximeesters, e.g. 1,2-octanedione 1[4-(phenylthio)phenyl]-2-(O-benzoyloxime) (IRGACURE® OXE01), ethanone 1-[9-ethyl-6-(2-methylbenzoyl)-9H-carbazol-3-yl]-1-(O-acetyloxime) (IRGACURE® OXE02), methanone [8-[[acetyloxy)imino][2-(2,2,3,3-tetrafluoropropoxy)phenyl]methyl]-11-(2-ethylhexyl)-11H-benzo[a]carbazol-5-yl](2,4,6-trimethylphenyl), [(E)-1-[4-[4-(benzofuran-2-carbonyl)phenyl]sulfanylphenyl]-4-methylpentylidene]amino] acetate, ethanone 1-[9-ethyl-6-(2-methyl-4-(2,2-dimethyl-1,3-dioxolanyl) methoxybenzoyl)-9H-carbazol-3-yl]-1-(O-acetyloxime), N-acetoxy-N-{3-[9-ethyl-6-(naphthalene-1-carbonyl)-9H-carbazol-3-yl]-1-methyl-3-acetoxyimino-propyl}-acetamide, 9H-thioxanthene-2-carboxaldehyde 9-oxo-2-(O-acetyloxime), [(E)-[1-(cyclohexylmethyl)-2-oxo-2-(4-phenylsulfanylphenyl)ethylidene]amino] cyclopropanecarboxylate), [(E)-[1-(cyclohexylmethyl)-2-oxo-2-(4-phenylsulfanylphenyl)ethylidene]amino] acetate, [(E)-[1-(cyclohexylmethyl)-2-[9-ethyl-6-(thiophene-2-carbonyl)carbazol-3-yl]-2-oxo-ethylidene]amino] acetate, [(E)-[1-(o-tolyl)-2-oxo-2-(4-phenylsulfanylphenyl)ethylidene] amino] acetate, [(E)-1-[1-(4-benzoylphenyl)indole-3-carbonyl]heptylideneamino] acetate, [(E)-1-[9-ethyl-6-(thiophene-2-carbonyl)carbazol-3-yl]ethylideneamino] acetate, [(E)-1-[9-ethyl-6-(thiophene-2-carbonyl)carbazol-3-yl]propylideneamino] acetate, [(E)-1-(9,9-dibutyl-7-nitrofluoren-2-yl)ethylideneamino] acetate, [(Z)-[2-(9,9-diethylfluoren-2-yl)-1-methyl-2-oxo-ethylidene]amino] acetate, oxime esters described in WO07/062963, WO07/071797, WO07/071497, WO05/080337, JP2010-049238, WO2008078678, JP2010-15025 and JP2010-49238, peresters, e.g. benzophenone tetracarboxylic peresters as described for example in EP 126541, monoacyl phosphine oxides, e.g. (2,4,6-trimethylbenzoyl)diphenylphosphine oxide (Omnirad TPO), ethyl (2,4,6-trimethylbenzoyl phenyl) phosphinic acid ester; bisacylphosphine oxides, e.g. bis(2,6-dimethoxy-benzoyl)-(2,4,4-trimethyl-pentyl)phosphine oxide, bis(2,4,6-trimethylbenzoyl)-phenylphosphine oxide (Omnirad 819), bis(2,4,6-trimethylbenzoyl)-2,4-dipentoxyphenylphosphine oxide, trisacylphosphine oxides, halomethyltriazines, e.g. 2-[2-(4-methoxyphenyl)-vinyl]-4,6-bis-trichloromethyl-[1,3,5]triazine, 2-(4-methoxy-phenyl) 4,6-bis-trichloromethyl-[1,3,5]triazine, 2-(3,4-dimethoxyphenyl)-4,6-bis-trichloromethyl-[1,3,5]triazine, 2-methyl-4,6-bis-trichloromethyl-[1,3,5]triazine, hexaarylbisimidazole/coinitiators systems, e.g. ortho-chlorohexaphenylbisimidazole combined with 2-mercaptobenzthiazole, ferrocenium compounds, or titanocenes, e.g. bis(cyclopentadienyl)-bis(2,6-difluoro-3-pyrryl-phenyl)titanium (Omnirad 784). Further, borate compounds, as for example described in U.S. Pat. No. 4,772,530, EP 775706, GB 2307474, GB 2307473 and GB 2304472. The borate compounds preferably are used in combination with electron acceptor compounds, such as, for example dye cations, or thioxanthone derivatives.

The Omnirad compounds are available from IGM Resins B.V. and the IRGACURE® compounds are available from BASF SE.

Further examples of additional photoinitiators are peroxide compounds, e.g. benzoyl peroxide (other suitable peroxides are described in U.S. Pat. No. 4,950,581, col. 19, I. 17-25) or cationic photoinitiators, such as aromatic sulfonium or iodonium salts, such as those to be found in U.S. Pat. No. 4,950,581, col. 18, I. 60 to col. 19, I. 10, or cyclopentadienyl-arene-iron(II) complex salts, for example (η6-isopropylbenzene)(η5-cyclopentadienyl)-iron(III) hexafluorophosphate.

The composition after step c) may be solvent-free or solvent-containing. Which variant is used usually depends on the process for applying the film.

Thus, the solids content of the of the composition obtained after step c) may be 100 to 5 wt. % based on the entire composition.

The process may comprise the following step c2) after step c)

c2) adding solvent (S) to the mixture obtained in step c).

Solvent(s) (S) which may be added in step c2) is/are selected from alcohols, preferably containing 1 to 6 carbon atoms, e.g. methanol, ethanol, 1-propanol, 2-propanol, butanol and ethylene glycol, ether alcohols such as 2-methoxypropanol, propyleneglycolmonomethylether, propyleneglycolmonoethylether, dipropyleneglycolmonomethylether, diethyleneglycolethylether and tetrahydrofurfuryl alcohol, ketones, such as acetone, 2-butanone, cyclopentanone, cyclohexanone, esters, such as propyleneglycolmonomethyletheracetate, propyleneglycolmonoethyletheracetate, ethyl acetate, methylformate and ethers, such as diethyl ether and THF, preferably alcohols, ether alcohols or ketones.

A mixture of up to five organic solvents may be used, preferably not more than three organic solvents are used. In another embodiment only one organic solvent is used.

In case of solvent-based systems, the solids content of the of the composition obtained after step c) is preferably 40 to 5 wt. % based on the entire composition, more preferably 25 to 10 wt. % based on the entire composition.

Hence, preferably, the solids content of the of the composition obtained after step c) is preferably 100 wt. % or 40 to 5 wt. % based on the entire composition, more preferably 100 wt. % or 25 to 10 wt. % based on the entire composition Usually the solids content after step c) remains unchanged until step d) is accomplished.

However, preferably the solids content after step c) is adjusted by dilution with solvents to obtain designated film thickness before step d).

The solids content prior to step d) is preferably not more than 75 wt. %, more preferably not more than 55 wt. %. Usually, the lower limit of solids content prior to step d) is preferably 0.5 wt. %.

The temperature during step c) before step d) is effected generally does not exceed 150° C., more preferably does not exceed 130° C.

The reaction time is usually below 10 days, preferably 30 min to 5 days.

A ligand (L) different from $(OR^3)$ may also be added after the combination of the first precursor composition and the second precursor composition. Usually, in this case, step b2a) is not effect.

Hence, in one variant, step b1a) but not step b2a) is effected. This variant, may comprise the following steps c3) and c4) effected after step c)

c3) heating the mixture obtained after step c), preferably to a temperature not higher than 150° C., more preferably not higher than 130° C.;

c4) optionally addition of a ligand (L) different from $(OR^3)$ as defined above.

In case step c4) is present, the reaction time of step c4) is usually below 10 days, preferably 2 hours to 5 days.

In case steps c3) and c4) are not present, the temperature during step c) before step d) is effected generally does not exceed 75° C., more preferably does not exceed 50° C.

Optional (meth)acrylate Ester (ME)

As outlined above, optionally a (meth)acrylate ester (ME) is added during the preparation of the first precursor composition (FPC), during the preparation of the second precursor composition (SPC) and/or during step c) or after step c) before step d) is effected.

The (meth)acrylate ester (ME) preferably has an average molecular weight of 150 to 5000 g/mol, more preferably 250 to 1500 g/mol, even more preferably 250 to 1000 g/mol.

The (meth)acrylate ester (ME) is preferably the ester of a di- or polyol including polymeric di- and polyols.

The di- or polyol is preferably selected from $C_2$ to $C_{10}$ di- or polyols, more preferably selected from $C_2$ to $C_6$ di- or polyols, even more preferably selected from $C_2$ to $C_4$ di- or polyols, such as ethylene glycol, 1,2-propylene glycol, 1,3-propylene glycol, 1,4-butanol, e.g. ethylene glycol and/or di- or polyol(s) having more than 10 carbon atoms, and comprising at least one aromatic moiety, e.g. dihydroxybenzene, dihydroxybiphenyl, bisphenol A, also other mono, di-, tri- or tetra-acrylates can be used such as trimethylolpropane triacrylate, trimethylolpropane trimethacrylate, di(trimethylolpropane)tetraacrylate, pentaerthritol tetraacrylate, Trimethylolpropane ethoxylate triacrylate, Bisphenol A ethoxylate diacrylate, 1,6-Hexanediol diacrylate, dihydroxybenzene, dihydroxybiphenyl, bisphenol A.

Thus, in case the (meth)acrylate ester (ME) is the ester of a di- or polyol including polymeric di- and polyols, one terminal group is the (meth)acrylate. Preferably, in this variant, the other terminal group(s) does/do not contain an OH-moiety, more preferably, the (meth)acrylate ester (ME) does not contain an OH-moiety.

Preferred terminal groups are monoalcohols, e.g. alcohols containing an aromatic moiety such as phenol, phenyl-phenol, naphthol.

Preferably, the (meth)acrylate ester (ME) is selected from compounds of the following formulas (V) and (VI)

$$TG\text{-}O\text{---}[R^{12}\text{---}O]_p\text{-}TG \quad\quad (V)$$

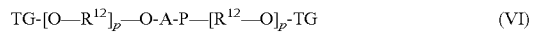

$$TG\text{-}[O\text{---}R^{12}]_p\text{---}O\text{-}A\text{-}P\text{---}[R^{12}\text{---}O]_p\text{-}TG \quad\quad (VI)$$

wherein $R^{12}$ is selected from a $C_2$ to $C_6$ diols, even more preferably selected from $C_2$ to $C_4$ diols, such as ethylene glycol, 1,2-propylene glycol, 1,3-propylene glycol, 1,4-butanol, e.g. ethylene glycol;

p is each independently selected from 1 to 20, more preferably 1 to 10, even more preferably are 1 or 2;

A is a dialcohol having more than 10 carbon atoms, preferably containing one or more aromatic moieties, e.g. dihydroxybenzene, dihydroxybiphenyl, bisphenol A;

TG is each independently selected from a vinyl ether group or a (meth)acrylic ester group or monoalcohols, e.g. alcohols containing an aromatic moiety such as phenol, phenyl-phenol, naphthol, with the proviso that at least one TG is a (meth)acrylic ester group.

Preferably, in formula (V) one TG is selected from a (meth)acrylic ester group, e.g. acrylic ester group and the other TG is selected from alcohols containing an aromatic moiety such as phenol, phenyl-phenol, naphthol, e.g. phenyl-phenol;

Preferably in formula (VI) both TG are selected from a (meth)acrylic ester group, e.g. acrylic ester group.

The (meth)acrylate ester (ME) is preferably added during the preparation of the second precursor composition (SPC) or during step c) or after step c) before step d) is effected.

In case the (meth)acrylate ester (ME) is added during the preparation of the second precursor composition (SPC) the total amount of the (meth)acrylate ester (ME) based on the total amount of the solids content of the second precursor composition (SPC) is preferably between 2 to 50 wt. %, more preferably between 2 to 40 wt. %.

In case the (meth)acrylate ester (ME) is added during step c) or after step c) before step d) is effected the total amount of the (meth)acrylate ester (ME) based on the total amount of the solids content of the mixture before step d) is effected is preferably between 1 to 40 wt. %, more preferably between 1 to 30 wt. %.

Preferably, the (meth)acrylate ester (ME) is not added during the preparation of the first precursor composition (FPC) before step c) is effected.

Step d

In step d) a thin film layer on the substrate is formed.

Liquid Phase Atmospheric Film Deposition and Optional Patterning

Thin films can be deposited on a substrate by using dip coating, slot coating, combined slot+spin coating, spin coating, spray coating, ink-jet printing, curtain coating, roller, roll-to-roll, printing screen printing or using a bar, a brush or by rubbing, more preferably by spray coating, slot coating, dip coating, spin coating, most preferably spray coating and spin coating (to mention few typical liquid phase deposition methods but not limited to these). Furthermore, the thin film can be optionally patterned by directly patterning by a lithography process (or other patterning method e.g. gravure, printing, ink-jet, 3D/4D printing etc.). By means of the invention, materials are provided which are suitable for produce films and structures. The layers can be deposited on various substrate surfaces, such as glass, quartz, silicon, silicon nitride, polymers, metals and plastics, such as organic or inorganic semiconductor materials and layers of an LED or an OLED.

Furthermore, the materials can be deposited on number of different surfaces such as different oxides, doped oxides, semimetals, layers in TFT, layers in OLED and LED and the like. The optional patterning/structuring of the thermally and/or irradiation sensitive material compositions can be performed via direct lithographic patterning, conventional lithographic masking and etching procedure, imprinting and embossing, but are not limited to these. The compositions can be used for making layers which are cured at relatively low processing temperatures, e.g. 80° C. or below, but are stable up to temperatures of 450° C. Hence, the layers formed from the compositions can also be cured at higher temperatures, i.e. temperatures over 230° C. and up to 450° C. In such case, the films or structures produced from the compositions can be combined with a subsequent high temperature deposition step, such as sputtering, firing, thermal evaporation and/or a CVD process. Depending on the used substrate the material is usually cured on hot-plate, in convection oven, by IR-lamp curing, or forced air cure between 80° C. and 450° C. Also specifically in cases where the material layer is deposited directly on a substrate, which is already attached to the display device substrate (or other substrate which can withstand a low cure temperature) the processing temperature is limited to max 100° C. or even to temperatures below 80° C.

Step e

In case solvent(s) are present in step d), in step e) the solvent(s) are preferably partially or completely removed after step d).

Usually the removal is accomplished either by vacuum-drying and/or thermo-drying. The vacuum-drying can be carried out at a pressure of 10 to 300 Pa, preferably at a pressure of 15 to 200 Pa. The thermos-drying (pre-bake) can be carried out at a temperature of 50 to 150° C., preferably at a temperature of 60 to 100° C.

Step f

In step f) the intermediate product obtained in step e), if present, or step d), if step e) is not present, is cured.

The curing is usually effected by exposure to heat, e.g. by using a convection oven, hot plate or IR irradiation.

The temperature used for curing usually does not exceed 450° C., preferably does not exceed 400° C., more preferably does not exceed 300° C. and most preferably does not exceed 250° C.

The curing time is usually 1.0 min to 5.0 hours, preferably 5.0 min to 3.0 hours, and most preferably 10 min to 1.0 hour.

The thickness of the thin film after step f) is preferably at least 50 nm, more preferably at least 100 nm and most preferably at least 150 nm. Usually the thickness of the thin film after step f) is not higher than 20 μm, preferably not more than 15 μm and most preferably not more than 10 μm.

Generally, the maximum temperature during steps d) to f) is below 450° C., preferably below 300° C., more preferably below 250° C. In certain embodiments the maximum temperature during steps d) to f) can be 100° C. or even below 80° C. Usually, the temperature during steps d) and f) is not lower than 20° C.

As mentioned earlier the simplest way of applying and curing of the thin film coating material to produce a film on substrate would be example slot coating, ink-jet printing or spin-coating (or can be also a printed structure in case of ink-jet) followed by thermal cure only, combined thermal+UV cure or UV-cure only. Below we give a bit more detailed description of example process for coating deposition including also the optional lithographic patterning.

Example process for coating deposition and optional patterning on a substrate:

1. Substrate pre-clean: Potassium hydroxide (KOH) pre-clean (the KOH solution can be at room temperature or temperature can be varied between 20° C.-55° C.; typical concentration can be varied from 0.04% to 1%) followed by UV-clean and deionized water rinse followed by a drying process. Alternatively adhesion promoters, primers or other chemical or physical (such as plasma ashing) surface modification methods can be used to improve wetting and adhesion.

2. Material deposition: Coating material is deposited on a substrate by using slot coating, combined slot+spin coating, spin coating, spray coating, ink-jet printing, curtain coating, roller, roll-to-roll, printing (to mention few typical liquid phase deposition methods). The formulation (solvent(s)+additives) is adjusted the way that a proper coating thickness, uniformity and planarization/conformality (to mention few typical requirements) of the coating are achieved.

3. Vacuum dry and/or pre-bake: After deposition the substrate is transferred to a vacuum dry station and/or pre-bake on a hot-plate (or oven) usually at 70-120° C. for 1-3 minutes. In this step major portion of the formulation solvent is removed and substrate is left with a pre cured film ready for further processing. Obviously, the prebake would be optional for the UV-cure only process.

4. Exposure: in a standard photolithography process, a photomask or reticle is used with broadband, g-,h-,i-line or i-line exposure. Typical UV exposure dose required is 50-200 mJ (or above) by using g-,h-,i-line exposure. In case no patterning is required for the deposited layer or the patterning is done by other means a full substrate area exposure can be used (without using any photomask or reticle). It is also possible to use so called wait step or post exposure bake step to improve exposed region curing. The material described in the current invention can function as a negative tone resist meaning the areas what are exposed polymerize under UV light (making the exposed areas less soluble to a developer). It is also possible to use the material as thermal cure formulation without using the UV-exposure in case no patterning is needed. In this case potentially thermal initiators can be applied.

5. Development (in case of lithographic patterning is applied): in the development step the more soluble regions of the film (see above) are dissolved by the developer solution. The less soluble regions (exposed areas in case of negative tone material) remain on the substrate after development. So called spray development or a buddle development methods can be used. The developer solvent can be at room temperature or temperature can be varied between 20-55 C. Typical developers include potassium hydroxide (KOH) and tetra methyl ammonium hydroxide (TMAH), but is not limited to these. Typical concentrations are e.g.

0.04%-0.7% for KOH and 0.2%-2.38% for TMAH. The application of the developer solution is followed by a deionized or standard water rinse spray or buddle. As a final step, water is dried off by air knife/blow and/or heating (blow or IR-cure, hot-plate or oven).

6. Final cure: depending on the used substrate and other coating material layers the material is cured in convection oven, by IR-lamp cure, forced air cure at 80-300 C or in case of only UV cure then only UV exposure is applied after deposition without any thermal curing.

Also specifically in cases where the material layer is deposited directly on a substrate, which is already attached to the display substrate the processing temperature is limited to max 100 C or even to temperatures below 80 C. Typical curing time can be example 30 min at temperature.

The thickness of the thin film (or patterned structure) after final cure can range from 10 nm to 15 µm. Typically, example in case of bottom emission OLED devices the required thickness from the out-coupling layer can range from 50 nm-500 nm. In case of top emission OLED device configuration the layer thickness requirement may range from 1 µm-10 µm. In case of optical thin films the requirements typically range in 10 nm-200 nm range.

Multi-Layer Structure

The present invention is furthermore directed to a multi-layer structure comprising at least one layer consisting of the thin film prepared according to the process of the invention. Thereby all embodiments of the process as described above also apply for the multi-layer structure.

The multi-layer structure can consist of 2, 3, 4, 5 or more and preferably less than 20 layers.

In one embodiment the multi-layer structure consists of two layers. In said embodiment the multi-layer structure consists of one layer consisting of the thin film prepared according to the process of the invention and a substrate layer. Thereby, one surface of the layer consisting of the thin film prepared according to the process of the invention is in direct contact with one surface of the substrate layer.

In another embodiment the multi-layer structure consists of more than two layers. Preferably, the multi-layer structure consists of 3, 4, 5, 6 or 7 layers, preferably of 4, 5 or 6 layers. In said embodiment the multi-layer structure preferably consists of one layer consisting of the thin film prepared according to the process of the invention, a substrate layer and 1, 2, 3, 4 or 5, preferably 2, 3 or 4 other layers. The other layer(s) can be the same or different from the one layer consisting of the thin film prepared according to the process of the invention. It is preferred that the other layer(s) are different from the one layer consisting of the thin film prepared according to the process of the invention.

Thereby, it is preferred that one surface of the layer consisting of the thin film prepared according to the process of the invention is in direct contact with one surface of the substrate layer. The other surface of the layer consisting of the thin film prepared according to the process of the invention is in direct contact with one surface of another layer which may be the same or different, preferably is different, from the one layer consisting of the thin film prepared according to the process of the invention.

In said embodiment the layer consisting of the thin film prepared according to the process of the invention is sandwiched by the substrate layer and another layer.

The surfaces of the optional one or more additional other layer(s) can either be in direct contact with the surface(s) of other layer(s) and/or with the surface of the substrate layer, preferably with only with the surface(s) of other layer(s).

The substrate layer can be any layer suitable for deposition with the layer consisting of the thin film prepared according to the process of the invention. The substrate layer can be an organic or inorganic layer. It is preferred that the substrate layer is selected from glass, quartz, silicon, silicon nitride, polymers, metals and plastics, such as organic or inorganic semiconductor materials and layers of an LED or an OLED, optionally deposited with metallic circuitry, such as thin film transistor (TFT) circuitry.

The optional other layer(s) can be any layer suitable for preparing the multi-layered structure according to the present invention. The optional other layer(s) can be organic, inorganic or metal layers.

Article

The present invention is furthermore directed to an article, comprising the thin film obtainable by the process according to the present invention or the multilayer structure according to the invention.

The article is preferably selected from
Optical and electrical coatings;
High-k dielectrics;
Light out-coupling/extraction layers;
Etch and CMP stop layers;
OLED protective/sealing/encapsulation coatings;
Organic solar cells; and
Optical thin film filters.

The inventive thin film can be used as an optical layer on a substrate as single optical layer or part of multilayer optical stack. A typical use is to improve out-coupling or in-coupling of light in a device configuration.

For example, the inventive thin film is deposited directly on the substrate (e.g. glass or plastic substrate) of a bottom emission Organic Light Emitting Diode (OLED) device, for example on a thin film transistor (TFT) structure. The TFT is typically part of a display device to driver the individual OLED pixels. For a top emission OLED, the outcoupling layer should be processed either directly on top electrode or alternatively as part of the TFE (Thin Film Encapsulation) stack. Here ideally the high index outcoupling layer would be applied between two or more inorganic layers (i.e. SiNx). The application of the high index organic layer could preferably be applied via ink-jet printing. To construct the actual OLED on the TFT circuitry, outcoupling layer could be processed directly on the electrode material (e.g. Indium Tin Oxide, ITO) which is processed directly on the TFT (or planarization/passivation layers thereof) or alternatively on top of the color filter in certain designs. In a bottom emission OLED device configuration, the inventive thin film must withstand curing temperatures up to 250° C. as the subsequent ITO layer deposition is typically done at relatively high temperature (also lower temperature deposition processes can be applied). More importantly, as all the sensitive OLED device layers will be deposited on top of the thin film layer it is essential to have very low outgassing from the thin film layer in the subsequent device layer deposition steps and during the lifetime of the device.

FIG. 1 represents simplified cross-section of bottom emission OLED device. Substrate on which the TFT circuitry is already deposited on (100). As next step, the material film (110) is applied on the TFT Substrate (100) which may or may not contain also color filter (color filter on array, COA design) followed by the deposition of the OLED layers (120). After the deposition of the OLED layers the device may be finalized by deposition of the device encapsulation layers (130). The refractive index and film thickness requirements of the material coating layer (110) are defined by the optics of the TFT Substrate (100) and OLED layer (120) design to maximize the out-coupling of the light emitted from the OLED device layer pixels travelling through the TFT Substrate for improved device efficiency. In the bottom emission OLED device configuration, the cathode of the OLED layer is non-transparent thus reflecting the emitted light downwards (see direction of arrows in FIG. 1). The material coating layer (110) can be used also for tuning of the possible micro-cavity effects to improve device efficiency.

OLED device can be also a lighting panel, in which case the driver circuitry can be a lot simpler, and in this case, it may be that the inventive material layer is deposited directly on device substrate (e.g. glass or plastic substrate) rather than on a thin film transistor structure. As earlier the inventive thin film again functions as out-coupling enhancement layer (improving external efficiency of the device), but at the same time can serve as a scatter layer, which might be a design requirement in case of lighting panel application. In this case the material coating layer is used in connection to the substrate and scatter particles are introduced into the thin film coating formulation. Of course multi-layer approaches with and without scatters can be combined for ideal effect. Such particles usually provide additional optical effects, e.g. to meet specific requirements, such as for lighting applications. These particles can be, for example $SiO_2$, $TiO_2$, $ZrO_2$, or similar inorganic particles.

In the top emission OLED configuration the inventive thin film acts as an optical layer but may also act as encapsulating layer. The thin-film can be used as an inorganic thin-film encapsulation layer as part of the full thin film encapsulation stack. Usually the encapsulation is accomplished using 3 to 10 layers. Furthermore, the inventive thin film can also act as planarization layer on top of the OLED (to help subsequent thin film encapsulation (TFE) layer deposition) and also allows tuning of the possible micro-cavity effect to improve efficiency of the device.

As the pixel density of the display devices increase due to requirement for higher resolution the planarization layer can help to reduce particle defects, which typically can arise from vacuum vapor deposition of the specific thick inorganic TFE layer. Also as the inventive thin film layer is particulate free, it will not inherently generate any particle defect to the thin film stack, which is potentially a big issue with the incumbent technologies where you mix nano/micro particles in polymer matrices and you will always have some particle agglomerates, which will be source for defect in the device and degradation of its lifetime. Also breaking the thin film encapsulation layer to thinner max 2-4 μm thick individual layers it will help to retain the flexibility of the structure, allowing flexibility of the device structure.

FIG. 2 represents a simplified cross-section of a top emission OLED device. In the top emission configuration the OLED Layers (210) (e.g. Anode/Hole transport layer/Emissive layer/Electron transport layer/Cathode) are deposited first on the TFT substrate (200). Material coating layer or layers (220) are deposited on the OLED layers (210). After material coating layer (220) (optional capping layer, can be inventive HRI material) the device encapsulation layers (230) (240) (250) are deposited. Typically layers 230 and 250 would be very thin inorganic layers such as silicon nitride and 240 would be the inventive HRI material sometimes referred to as particle covering layer (PCL). The material coating layer(s) can be part of the encapsulation layer(s) or even in some arrangements it may be preferred the material coating layer can be preferred to be deposited as the last layer after the encapsulation layer(s) (various constructions comprising (230) and (240) can be envisioned. In this represented structure the OLED device is a top emission configuration where the light is emitted through the encapsulation layer(s) (see direction of the arrows in FIG. 2).

Another potential configuration linked with the OLED is drawn in FIG. 3. In the top emission configuration the OLED Layers (310) (e.g. Anode/Hole transport layer/Emissive layer/Electron transport layer/Cathode) are deposited first on the TFT substrate (300). Material coating layer or layers (320) are deposited on the OLED layers (310). After material coating layer (320), the device encapsulation layers (330) (340) (350) are deposited. Typically layers 330 and 350 would be very thin inorganic layers such as silicon nitride and (340) would be the inventive HRI material sometimes referred to as particle covering layer (PCL). The material coating layer(s) can be part of the encapsulation layer(s) or even in some arrangements it may be preferred the material coating layer can be preferred to be deposited as the last layer after the encapsulation layer(s) (various constructions comprising (330) and (340) can be envisioned. And the inorganic (330) and material coating layer (340) could be applied multiple times in order to reach the optimal result for the water/oxygen inhibition or optical effect. In this represented structure the OLED device is a top emission configuration where the light is emitted through the encapsulation layer(s) (see direction of the arrows in FIG. 3).

Furthermore, in case of the top emission OLED structure it is preferable to be able to process the optical and FTE layers by using ink-jet printing or combined slit coating and ink-jet printing approach. This will allow eventually lower capital investment and lower cost production.

Preferred variants and embodiments of the process of the present invention and the multi-layer structure of the present invention are also preferred variants and embodiments of the article according to the present invention.

Composition

The present invention is furthermore directed to a composition comprising a first precursor composition (FPC) and a second precursor composition (SPC), the first precursor composition (FPC) being one or more polymerized metal or metalloid compound according to formula (I)

   (I)

wherein $M^1$ is a metal or metalloid with a valence z $R^1$ is each independently selected from a $C_1$ to $C_{10}$ organyl or organoheteryl group;

$R^2$ is each independently selected from a $C_1$ to $C_{20}$ organyl or organoheteryl group n is 1 to z−1 m is 1 to z−1 n+m is z whereby the polymerization is effected by at least partial hydrolysation of the $M^1(OR^1)$-moieties;

the second precursor composition (SPC) being obtainable by b1a) providing a metal or metalloid compound according to the following formula (II)

   (II)

wherein $M^2$ is a metal or metalloid with a valence y, whereby $M^1$ and $M^2$ are based on different elements of the periodic table;

$R^3$ is each independently selected from a $C_1$ to $C_{10}$ organyl or organoheteryl group;

o is y b2a) optionally reacting the metal or metalloid compound according to formula (II) with a ligand (L) different from ($OR^3$);

or b1b) directly providing the reaction product of step b2a).

Preferred features of the process according to the present invention are also preferred features of the composition of the present invention.

The present invention is furthermore directed to a kit-of-parts comprising a first precursor composition (FPC) in a first vessel and a second precursor composition (SPC) in a second vessel, the first precursor composition (FPC) being one or more polymerized metal or metalloid compound according to formula (I)

$$M^1(OR^1)_n R^2_m \qquad (I)$$

wherein $M^1$ is a metal or metalloid with a valence z $R^1$ is each independently selected from a $C_1$ to $C_{10}$ organyl or organoheteryl group;

$R^2$ is each independently selected from a $C_1$ to $C_{20}$ organyl or organoheteryl group n is 1 to z−1 m is 1 to z−1 n+m is z whereby the polymerization is effected by at least partial hydrolysation of the $M^1(OR^1)$-moieties;

the second precursor composition (SPC) being obtainable by b1a) providing a metal or metalloid compound according to the following formula (II)

$$M^2(OR^3)_o \qquad (II)$$

wherein $M^2$ is a metal or metalloid with a valence y, whereby $M^1$ and $M^2$ are based on different elements of the periodic table;

$R^3$ is each independently selected from a $C_1$ to $C_{10}$ organyl or organoheteryl group;

o is y b2a) optionally reacting the metal or metalloid compound according to formula (II) with a ligand (L) different from ($OR^3$);

or b1b) directly providing the reaction product of step b2a).

Preferred features of the process and the composition according to the present invention are also preferred features of the kit-of-parts of the present invention.

The present invention is furthermore directed to the use of the composition or the kit-of-parts according to the present invention for preparing a thin film on a substrate.

The present invention is furthermore directed to the use of the composition or the kit-of-parts according to the present invention for preparing an optical or electrical coating.

The present invention is furthermore directed to the use of the composition according to the present invention for preparing Optical and electrical coatings;
High-k dielectrics;
Light out-coupling/extraction layers;
Etch and CMP stop layers;
OLED protective/sealing/encapsulation coatings;
Organic solar cells; or
Optical thin film filters.

EXPERIMENTAL PART

Measuring Methods

Figure 1:
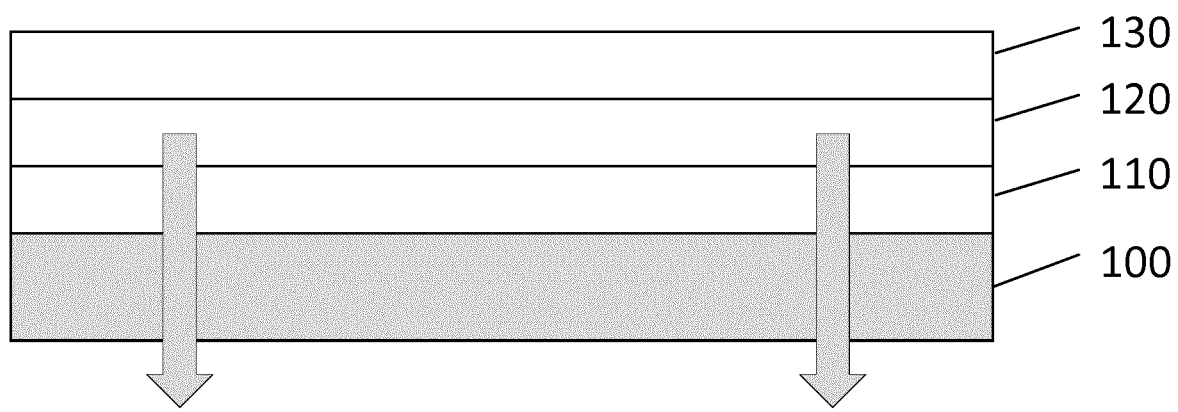
FIG. 1 shows a simplified cross-section of bottom emission OLED device
Figure 2:
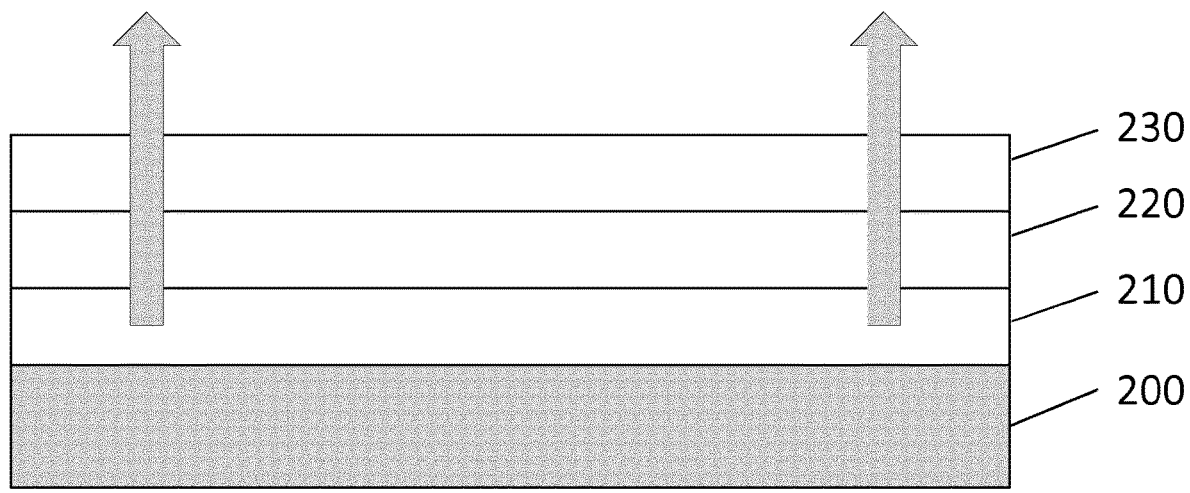
FIG. 2 shows a simplified cross-section of a top emission OLED device
Figure 3:
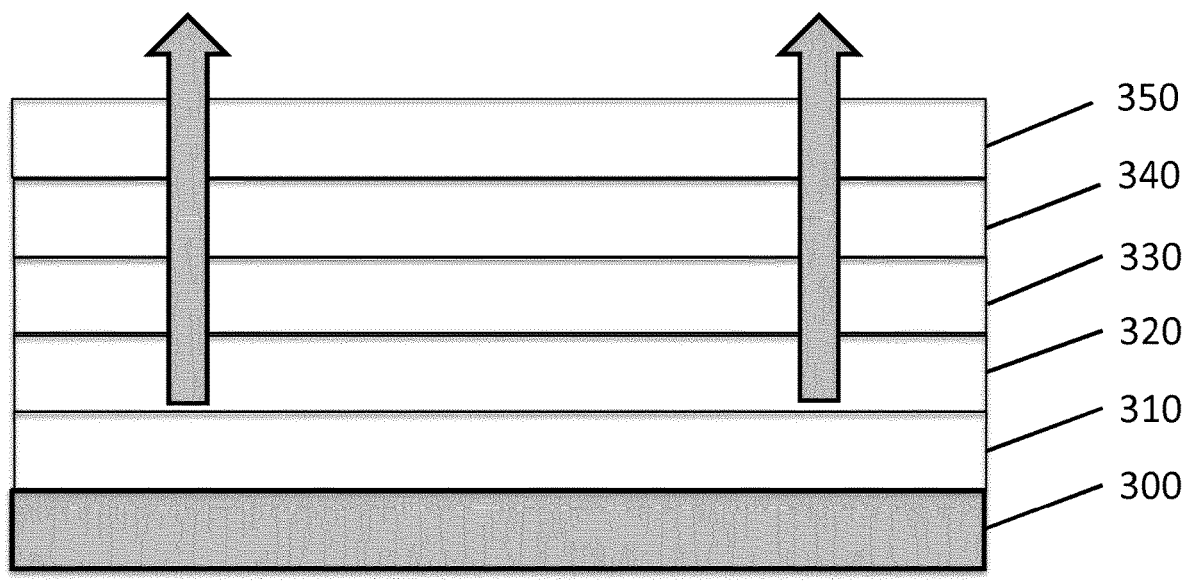
FIG. 3 shows a simplified cross-section of a top emission OLED device with thin film encapsulation layers

Molecular weight of the polymer obtained after step a2)

The tool used the measure molecular weight is WATERS GPC (gel permeation chromatography): waters 1515 Isocratic HPLC pump, waters 2414 refractive index detector.

Polystyrene standards are used as calibration standards for the measurement. The actual samples for the measurements are prepared as 4m-% samples using THF as eluent solution.

Solids Content

The tool used to determine the molecular weight is Mettler Toledo HB43 Halogen dryer/balance.

Sample is weighted on aluminum dish/cup and measurement is performed using about 1 gram of material.

Shelf Life Determination

See application examples 24 and 24C for actual measurement data. Material shelf life is determined by following material process/application result stability/repeatability as cured film. The values monitored from cured film are film thickness and film refractive index. The film thickness and refractive index are characterized by using Ellipsometer (UVISEL-VASE Horiba Jobin-Yvon). Measurements are performed using Gorilla Glass 4 or silicon wafer (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat:1 SEMI Standard) as substrates. Material film depositions are done by using spin coating, pre-cured using hot-plate, UV-exposure performed by broadband UV source and final bake performed in convection oven. Optionally materials can be UV-cured only or thermal cured only.

Viscosity

Tool manufacturer: Grabner Instruments Viscometer MINIVIS-II. Measurement method "Falling ball viscosity measurement". Samples are measured at 20° C. by using steel ball with 3.175 mm diameter.

Transmission

Konica Minolta spectrophotometer CM-3700A (Spectra-Magic NX software). The preparation of the specimen is described in the respective example.

Color and Haze Measurement

L*(D65), a*(D65) and b*(D65) and Haze were determined by using Konica Minolta spectrophotometer CM-3700A (Spectra Magic NX software). Measurements are performed using Gorilla Glass 4 as substrates. Material film depositions are done by using spin coating, pre-cured using hot-plate, UV-exposure performed by broadband UV source and final bake performed in convection oven. Optionally materials can be UV-cured only or thermal cured only. Also optionally the materials are ink-jet deposited on glass.

Refractive Index

The film refractive index is characterized by using Ellipsometer (UVISEL-VASE Horiba Jobin-Yvon). Measurements are performed using Gorilla Glass 4 or silicon wafer (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat:1 SEMI Standard) as substrates. Material film depositions are done by using spin coating, pre-cured using hot-plate, UV-exposure performed by broadband UV source and final bake performed in convection oven. Optionally materials can be UV-cured only or thermal cured only. Also optionally the materials are ink-jet deposited on glass.

Film Thickness

The film thickness is measured by using Ellipsometer (UVISEL-VASE Horiba Jobin-Yvon). Measurements are performed using Gorilla Glass 4 or silicon wafer (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat:1 SEMI Standard) as substrates. Material film depositions are done by using spin coating, pre-cured using hot-plate, UV-exposure performed by broadband UV source and final bake performed in convection oven. Optionally materials can be UV-cured only or thermal cured only. Also optionally the materials are ink-jet deposited on glass.

Thermogravimetric Analysis (TGA)

A sample of 2.0 mg weight was set in TGA/DTA Simultaneous Measuring Instrument DTG-60A, Shimadzu Japan, and heated up to 160° C., 230° C. and 250° C. continuously under Nitrogen flow atmosphere. The heating rate was 10° C./min and the temperature of 160° C. was held for 60 min, the temperature of 230° C. was held for 60 min and the temperature of 250° C. was held for 30 min.

EXPERIMENTAL RESULTS

Used Substances

MIRAMER M1142, o-phenylphenolethyleneoxide acrylate, CAS-no. 72009-86-0, MW =268 g/mol supplied by Miwon MIRAMER M244, Bisphenol A (ethylene oxide)$_3$ diacrylate, CAS-no. 64401-02-1, MW=468 g/mol, supplied by Miwon Inventive Example 1

2.34 g of methacryloxypropylmethyldimethoxysilane, 0.5 g of water, 8 g of propyleneglycolmonomethylether and 0.2 g of triethylamine were placed in a round bottom flask and stirred for 30 min at 80° C. (oil bath). 16 g of propyleneglycolmonomethylether was added to the reaction mixture. 5.2 g of tetraisopropylorthotitanate was added to the reaction mixture drop-wisely (5 min) at 80° C. (Gradual and slow addition is important. Otherwise, TiO2 particle generate). The mixture was stirred for 3 hours at 80° C., giving a transparent solution. The solids content (SC) of the obtained solution was 14 wt. %.

Inventive Example 2

The procedure of inventive example 1 was repeated except that 8.4 g of tetraisopropylorthotitanate was used, resulting in a transparent solution with an SC of 15 wt. %.

Inventive Example 3

The procedure of inventive example 2 was repeated except that instead of trimethylamine, 0.2 g of 2,6,10-trimethyl-2,6,10-triazaundecane was used, resulting in a transparent solution with an SC of 15 wt. %.

Inventive Example 4

The procedure of inventive example 1 was repeated except that 5.2 g of 3-glycidoxypropylmethyldimethoxysilane instead of methacryloxypropylmethyldimethoxysilane was used, resulting in a transparent solution with an SC of 14 wt. %.

Inventive Example 5

The procedure of inventive example 4 was repeated except that 11 g of 3-glycidoxypropylmethyldimethoxysilane was used, resulting in a transparent solution with an SC of 20 wt. %.

Inventive Example 6

4.68 g of methacryloxypropylmethyldimethoxysilane, 1.0 g of water, 16 g of propyleneglycolmonomethylether and 0.4 g of triethylamine were placed in a round bottom flask and stirred for 30 min at 80° C. (oil bath). 32 g of propyleneglycolmonomethylether was added to the reaction mixture. 16.8 g of tetraisopropylorthotitanate was added to the reaction mixture drop-wisely (4 min) at 80° C. The mixture was stirred for 3 hours at 130° C. and further stirred for 4 hours at 130° C. with distillation, resulting in a transparent solution with an SC of 17 wt. %.

Inventive Example 7

4.68 g of glycidoxypropylmethyldimethoxysilane, 1.0 g of water, 16 g of propyleneglycolmonomethylether and 0.4 g of triethylamine were placed in a round bottom flask and stirred for 30 min at 80° C. (oil bath). 32 g of propyleneglycolmonomethylether was added to the reaction mixture. 22 g of tetraisopropylorthotitanate was added to the reaction mixture drop-wisely (8 min) at 80° C. The mixture was stirred for 3 hours at 130C and further stirred for 4 hours at 130° C. with distillation, resulting in a transparent solution with an SC of 26 wt. %.

Inventive Example 8

9.36 g of glycidoxypropylmethyldimethoxysilane, 2 g of water, 32 g of propyleneglycolmonomethylether and 0.8 g of triethylamine were placed in a round bottom flask and stirred for 30 min at 80° C. (oil bath). 64 g of propyleneglycolmonomethylether was added to the reaction mixture. 44 g of tetraisopropylorthotitanate was added to the reaction mixture drop-wisely (18 min) at 80° C. The mixture was stirred for 3 hours at 80° C. Thereafter, the generated alcohol was removed by evaporation under reduced pressure, resulting in a transparent solution with an SC of 31 wt. %.

Inventive Example 9

The procedure of inventive example 1 was repeated except that 2.34 g of mercaptopropyl methyldimethoxysilane was used instead of methacryloxypropylmethyldimethoxysilane, resulting in a transparent solution with an SC of 17 wt. %.

Inventive Example 10

The procedure of inventive example 9 was repeated except that 8.4 g tetraisopropylorthotitanate was used, resulting in a transparent solution with an SC of 16 wt. %.

Inventive Example 11

9.36 g of glycidoxypropylmethyldimethoxysilane, 2 g of water, 32g of propyleneglycolmonomethylether and 0.8 g of triethylamine were placed in a round bottom flask and stirred for 30 min at 80° C. (oil bath). 64 g of propyleneglycolmonomethylether was added to the reaction mixture. 59.6 g of titanium tetra n-butoxide was added to the reaction mixture drop-wisely (9 min) at 80° C. The mixture was stirred for 3 hours at 100° C., resulting in a transparent solution with an SC of 19 wt. %.

Inventive Example 12

The procedure of inventive example 5 was repeated whereby to 30 g of the resulting transparent solution 6 g of ethylacetoacetate was added and the resulting mixture was stirred for 24 h at 25° C., resulting in a transparent solution with an SC of 17 wt. %.

Inventive Example 13

The procedure of inventive example 5 was repeated whereby to 30 g of the resulting transparent solution 12 g of ethylacetoacetate was added and the resulting mixture was stirred for 48 h at 25° C., resulting in a transparent solution with an SC of 13 wt. %.

Inventive Example 14

3.12 g of glycidoxypropylmethyldimethoxysilane, 9 g of dimethyldiethoxysilane, 2 g of water, 32 g of propyleneglycolmonomethylether and 0.8 g of triethylamine were placed in a round bottom flask and stirred for 30 min at 80° C. (oil bath). 64 g of propyleneglycolmonomethylether was added to the reaction mixture. 44 g of tetraisopropylorthotitanate was added to the reaction mixture drop-wisely (7 min) at 80° C. The mixture was stirred for 3 hours at 100° C., resulting in a transparent solution with an SC of 16 wt. %.

Inventive Example 15

The procedure of inventive example 11 was repeated whereby to 20 g of the resulting transparent solution 4 g of ethylacetoacetate and 16 g propyleneglycolmonomethylether were added and the resulting mixture was stirred for 72 h at 25° C., resulting in a transparent solution with an SC of 10 wt. %.

Inventive Example 16

2.11 g of methacryloylpropyltrimethoxysilane, 0.23 g of glycidoxypropylmethyldimethoxysilane, 0.5 g of water, 8 g of propyleneglycolmonomethylether and 0.2 g of triethylamine were placed in a round bottom flask and stirred for 30 min at 80° C. (oil bath). 16 g of propyleneglycolmonomethylether was added to the reaction mixture. 8.4 g of tetraisopropylorthotitanate was added to the reaction mixture drop-wisely at 80° C. The mixture was stirred for 6 hours at 80° C., resulting in a transparent solution with an SC of 17 wt. %.

Inventive Example 17

2.34 g of glycidoxypropyltrimethoxylsilane, 0.5 g of water, 32 g of propyleneglycolmonomethylether and 0.8 g of triethylamine were placed in a round bottom flask and stirred for 30 min at 80° C. (oil bath). 64 g of propyleneglycolmonomethylether was added to the reaction mixture. 11 g of tetraisopropylorthotitanate was added to the reaction mixture drop-wisely at 80° C. The mixture was stirred for 20 hours at 80° C., resulting in a transparent solution with an SC of 23 wt. %.

Inventive Example 18

1.76 g of glycidoxypropylmethyldimethoxylsilane, 0.58 g of glycidoxypropyltrimethoxylsilane, 0.5 g of water, 32 g of propyleneglycolmonomethylether and 0.8 g of triethylamine were placed in a round bottom flask and stirred for 30 min at 80° C. (oil bath). 64 g of propyleneglycolmonomethylether was added to the reaction mixture. 11 g of tetraisopropylorthotitanate was added to the reaction mixture drop-wisely at 80C. The mixture was stirred for 20 hours at 80C, resulting in a transparent solution with an SC of 21 wt. %.

Inventive Example 19

Solution 1: Methacryloxypropyltriethoxysilane (120 g) was added to the reaction flask and 21 g water (0.1M $HNO_3$) was added. The reaction mixture was refluxed at 95° C. in an oil bath for 3 hours and 40 min. The solution was cooled down and mixture of triethylamine (0.39 g) and 2-propanol (3.51 g) was added and refluxing was continued for 65 min. After reflux, solvent was removed under reduced vacuum. Molecular weight of the material was 1000.

Solution 2. To the Zirkonium (IV) butoxide solution 80% in butanol (400 g) was added Ethylacetoacetate (217.08 g).

Solution was mixed at room temperature for 5 days. Solvent removal was done under reduced pressure.

Mixture preparation: To 1 l round bottom flask was added solution 1 (2.5 g), 1-methoxy-2-propanol (850 g), dipropyleneglycol (50 g), solution 2 (97.5 g) and BYK333 (2.9 g). Solution was mixed at room temperature for 2 hours.

Inventive Example 20

Solution 1. To the Zirkonium (IV) isopropoxide solution 70% in 2-propanol (50 g) was added Ethylacetoacetate (83.43 g). Solution was mixed at room temperature for 5 days. Solvent removal was done under reduced pressure.

Solution 2: Methacryloxypropyltriethoxysilane (36 g) was added to the reaction flask and 6.3 g water (0.1M $HNO_3$) was added. The reaction mixture was stirred at room temperature for 3 days. Solvent removal was done under reduced pressure. Molecular weight of the material was 1000.

Mixture preparation: To the 500 ml round bottom flask was added solution 1 (77 g), solution 2 (3 g) and Miramer M1142 (20 g). Solution was mixed at room temperature for 2 hours.

Inventive Example 21

Solution 1. To the Zirkonium (IV) isopropoxide solution 70% in 2-propanol (50 g) was added Ethylacetoacetate (111.24 g). Solution was mixed at room temperature for 5 days. Solvent removal was done under reduced pressure.

Solution 2: Methacryloxypropyltriethoxysilane (36g) was added to the reaction flask and 6.3 g water (0.1M $HNO_3$) was added. The reaction mixture was stirred at room temperature for 3 days. Solvent removal was done under reduced pressure. Molecular weight of the material was 1000.

Mixture preparation: To the 500 ml round bottom flask was added solution 1 (77 g), solution 2 (3 g) and Miramer M1142 (20 g). Solution was mixed at room temperature for 2 hours.

Inventive Example 22

Solution 1. To the Zirkonium (IV) isopropoxide solution 70% in 2-propanol (50 g) was added Ethylacetoacetate (83.43 g). Solution was mixed at room temperature for 5 days. Solvent removal was done under reduced pressure. Mass of the solution after solvent removal was 96.2 g.

Solution 2: Methacryloxypropyltriethoxysilane (36 g) was added to the reaction flask and 6.3 g water (0.1 M $HNO_3$) was added. The reaction mixture was stirred at room temperature for 3 days. Solvent removed was done under reduced pressure. Molecular weight of the material was 1000.

Mixture preparation: To the 100 ml flask was added solution 1 (67 g), solution 2 (3 g), Miramer M244 (30 g) and BYK3700 (2 g). Solution was mixed 2 hours at room temperature.

Inventive Example 23

Solution 1. To the Zirkonium (IV) isopropoxide solution 70% in 2-propanol (200 g) was added Ethylacetoacetate (222.48 g). Solution was mixed at room temperature for 5 days. Solvent removal was done under reduced pressure. Mass of the solution after solvent removal was 270.46 g.

Solution 2: Methacryloxypropyltriethoxysilane (36 g) was added to the reaction flask and 6.3 g water (0.1 M $HNO_3$) was added. The reaction mixture was stirred at room temperature for 3 days. Solvent removed was done under reduced pressure. Molecular weight of the material was 1000.

Mixture preparation: To the 100 ml flask was added solution 1 (67 g), solution 2 (3 g), Miramer M1142 (30 g) and BYK3700 (2 g). Solution was mixed 2 hours at room temperature.

Inventive Example 24

Solution 1. To the Zirkonium (IV) butoxide solution 80% in butanol (1963 g) was added Ethylacetoacetate (1066 g). Solution was mixed at room temperature for 5 days. Solvent removal was done under reduced pressure.

Solution 2: Miramer 1142 (90 g) was added to the reaction flask, 2-propanol (60 g) and 5.1 g water (0.01 M $HNO_3$) was added. Solution was stirred at room temperature for 16 hours.

Solution 3. Phenyltrimethoxysilane (5.42 g) was added to the round bottom flask and 1.42 g of water (0.01 M $HNO_3$) was added. Solution was stirred at room temperature for 16 hours. Mixture preparation: Solution 2 (155.1 g) and Solution 1 (2372.0 g) were combined. To the combined solution was added 2-methoxy-1-propanol (4145.0 g). Solution 3 (6.9 g) was added to the Solution 1+2. At the end 539.49 g of 2-methoxy-1-propanol was added. Solution was stirred at room temperature for 20 hours.

Inventive Example 25

Solution 1. To the Zirkonium (IV) butoxide solution 80% in butanol (1963 g) was added Ethylacetoacetate (1066 g). Solution was mixed at room temperature for 5 days. Solvent removal was done under reduced pressure.

Solution 2: Miramer 1142 (90 g) was added to the reaction flask, 2-propanol (60 g) and 5.1 g water (0.01 M $HNO_3$) was added. Solution was stirred at room temperature for 16 hours. Solution 3. Phenyltrimethoxysilane (5.42 g) was added to the round bottom flask and 1.42 g of water (0.01 M $HNO_3$) was added. Solution was stirred at room temperature for 16 hours. Mixture preparation: Solution 2 (9.36 g) and Solution 1 (144.0 g) were combined. To the combined solution was added 2-methoxy-1-propanol (252.0 g). Solution 3 (0.41 g) was added to the Solution 1+2. At the end 361.38 g of 2-methoxy-1-propanol was added. Solution was stirred at room temperature over a night.

Inventive Example 26

Solution 1: To the Zirkonium (IV) butoxide solution 80% in butanol (1963 g), was added Ethylacetoacetate (1066 g). Solution was mixed at room temperature for 5 days. Solvent removal was done under reduced pressure. Solution 2: Miramer 1142 (90 g) was added to the reaction flask, 2-propanol (60 g) and 5.1 g water (0.01 M $HNO_3$) was added. Solution was stirred at room temperature for 16 hours. Solution 3: Phenyltrimethoxysilane (5.42 g) was added to the round bottom flask and 1.42 g of water (0.01 M $HNO_3$) was added. Solution was stirred at room temperature for 16 hours. Mixture preparation: Solution 1 (1244.3 g) and Solution 2 (80.9 g) were combined. To the combined solution was added 2-methoxy-1-propanol (2177.9 g). Solution 3 (3.8 g) was added to the Solution 1+2. At the end 283.2 g of 2-methoxy-1-propanol was added. Solution was stirred at room temperature for 20 hours. Measured viscosity 3.6 mPa-s. Alternatively, instead of solvent PGME, various solvents can be used—from single solvents like THF-A (tetrahydrofurfuryl alcohol), PGMEA, Cyclohexanone, Ethylene glycol, Dipropylene glycol monomethyl ether, Diethylene glycol ethyl ether, and their combinations in different ratios.

Inventive Example 27

Solution 1. To the Zirkonium (IV) butoxide solution 80% in butanol (1963 g), was added Ethylacetoacetate (1066 g). Solution was mixed at room temperature for 5 days. Solvent removal was done under reduced pressure. Solution 2. Miramer 1142 (90 g) was added to the reaction flask, 2-propanol (60 g) and 5.1 g water (0.01M $HNO_3$) was added. Solution was stirred at room temperature for 16 hours. Solution 3: Phenyltrimethoxysilane (5.42 g) was added to the round bottom flask and 1.42 g of water (0.01M $HNO_3$) was added. Solution was stirred at room temperature for 16 hours. Mixture preparation: Solution 1 (268g) and Solution 2 (17.42 g) were combined. To the combined solution was added PGME (2-methoxy-1-propanol, 220.43 g). Amount of 0.50 g of solution 3 was added, and final mixture was stirred at room temperature over a night. Measured viscosity 6.9 mPa-s.

Inventive Example 28

Solution 1. To the Zirkonium (IV) butoxide solution 80% in butanol (1963 g), was added Ethylacetoacetate (1066 g). Solution was mixed at room temperature for 5 days. Solvent removal was done under reduced pressure. Solution 2. Miramer 1142 (90 g) was added to the reaction flask, 2-propanol (60 g) and 5.1 g water (0.01 M $HNO_3$) was added. Solution was stirred at room temperature for 16 hours. Solution 3: Phenyltrimethoxysilane (5.42 g) was added to the round bottom flask and 1.42 g of water (0.01 M $HNO_3$) was added. Solution was stirred at room temperature for 16 hours. Mixture preparation: Solution 1 (268 g) and Solution 2 (17.42 g) were combined. To the combined solution was added a solvent mixture of PGMEA (1-methoxy-2 propyl acetate, 210.13 g). Amount of 0.50 g of solution 3 was added, and final mixture was stirred at room temperature over a night. Measured viscosity of the solution was 3.9 mPa-s.

Inventive Example 29

Solution 1. To the Zirkonium (IV) butoxide solution 80% in butanol (1963 g), was added Ethylacetoacetate (1066 g). Solution was mixed at room temperature for 5 days. Solvent removal was done under reduced pressure. Solution 2. Miramer 1142 (90 g) was added to the reaction flask, 2-propanol (60 g) and 5.1 g water (0.01 M $HNO_3$) was added. Solution was stirred at room temperature for 16 hours. Solution 3: Phenyltrimethoxysilane (5.42 g) was added to the round bottom flask and 1.42 g of water (0.01 M $HNO_3$) was added. Solution was stirred at room temperature for 16 hours. Mixture preparation: Solution 1 (268 g) and Solution 2 (17.42 g) were combined. To the combined solution was added a solvent mixture of PGMEA (1-methoxy-2 propyl acetate, 35.18 g), and Tetrafurfuryl alcohol (82.08 g). Amount of 0.40 g solution 3 was added, and final mixture was stirred at room temperature over a night. Measured viscosity of solution was 20.0 mPa-s.

Inventive Example 30

2.34 g of glycidoxypropylmethyldimethoxysilane, 0.5 g of water, 24 g of propyleneglycol monomethylether and 0.2 g of triethylamine were placed in a round bottom flask and stirred for 30 min at 80° C. (oil bath). 12 g of tetraisopropylorthotitanate was added to the reaction mixture drop-wisely at 80° C. The mixture was stirred for 3 hours at 100° C. After cooling down to room temperature, 4.6 g of chlorotrimethylsilane was added to the reaction mixture and heated at 100° C. for 1.5 hours, resulting in a transparent solution with an SC of 22 wt. %.

Inventive Example 31

The procedure of inventive example 30 was repeated except that 2.3 g of chlorotrimethylsilane was used, resulting in a transparent solution with an SC of 21 wt. %.

Inventive Example 32

2.34 g of mercaptpropylmethyldimethoxysilane, 0.5 g of water, 24 g of propyleneglycol monomethylether and 0.2 g of triethylamine were placed in a round bottom flask and stirred for 30 min at 80° C. (oil bath). 14.8 g of tetraisopropylorthotitanate was added to the reaction mixture drop-wisely at 80° C. The mixture was stirred for 3 hours at 100° C. After cooling down to room temperature, 2.8 g of chlorotrimethylsilane was added to the reaction mixture and heated at 100° C. for 1.5 hours, resulting in a transparent solution with an SC of 19 wt. %.

Inventive Example 33

2.34 g of mercaptpropylmethyldimethoxysilane, 0.5 g of water, 24 g of propyleneglycol monomethylether and 0.2 g of triethylamine were placed in a round bottom flask and stirred for 30 min at 80° C. (oil bath). 7.4 g of tetraisopropylorthotitanate was added to the reaction mixture drop-wisely at 80° C. The mixture was stirred for 3 hours at 100° C. After cooling down to room temperature, 0.25 g of water and 5.6 g of chlorotrimethylsilane was added to the reaction mixture and heated at 100° C. for 1.5 hours, resulting in a transparent solution with an SC of 17 wt. %.

Inventive Example 34

2.34 g of glycidoxypropylmethyldimethoxysilane, 0.5 g of water, 24 g of propyleneglycol monomethylether and 0.2 g of triethylamine were placed in a round bottom flask and stirred for 30 min at 80° C. (oil bath). 12 g of tetraisopropylorthotitanate was added to the reaction mixture drop-wisely at 80° C. The mixture was stirred for 3 hours at 100° C. A mixture of 5 g of ethoxytrimethylsilane, 0.5 g of water, 4 g of propyleneglycol monomethylether and 0.2 g of triethylamine was added to the reaction mixture drop-wisely and heated at 100° C. for 15 hours, resulting in a transparent solution with an SC of 16 wt. %.

Inventive Example 35

2.34 g of glycidoxypropylmethyldimethoxysilane, 0.5 g of water, 24 g of propyleneglycol monomethylether and 0.2 g of triethylamine were placed in a round bottom flask and stirred for 30 min at 80° C. (oil bath). 12 g of tetraisopropylorthotitanate was added to the reaction mixture drop-wisely at 80° C. The mixture was stirred for 3 hours at 100°

C. A mixture of 6.3g of diethoxydimethylsilane, 0.5 g of water, 4g of propyleneglycol monomethylether and 0.2 g of triethylamine was added to the reaction mixture drop-wisely and heated at 100° C. for 18 hours, resulting in a transparent solution with an SC of 17 wt. %.

Figure 4:
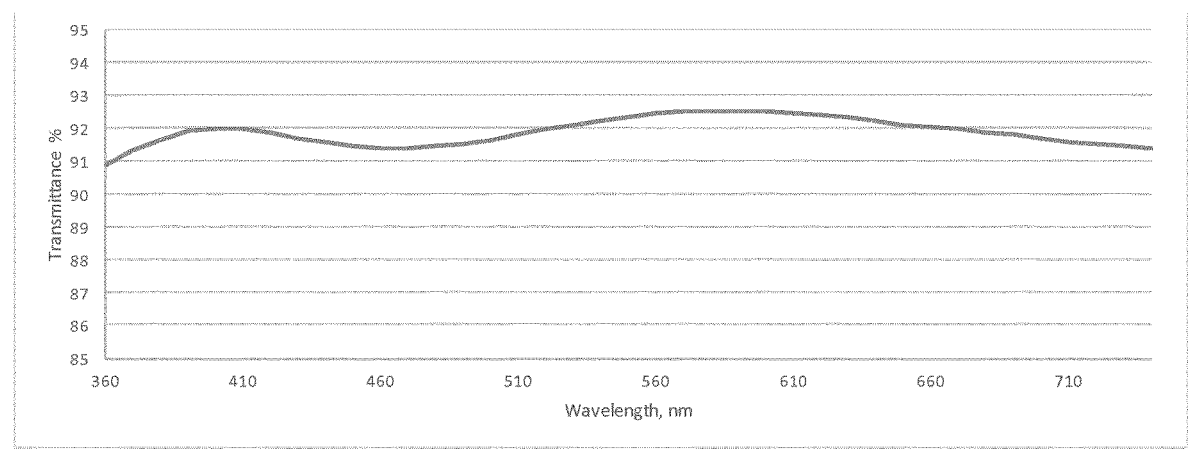
FIG. 4 shows the transmission graph of the film obtained in application example 19, (spectrum includes glass substrate).

Application Example 19 the thin film coating material of inventive example 19 was deposited on glass by spray coating method. Coating material solid content was about 9.8%. The spray coat parameters to deposit the layer on Gorilla glass 4 are following: Scan speed: 300 mm/s, Pitch: 50 mm, Gap: 50-100 mm, Flow rate: 3-10 ml/min, Atomization air pressure: 5 kg/cm$^2$. After spray deposition the films were cured in convection oven at 150C for 30 min. FIG. 4 shows the transmission graph of the resulting material. The reflection and absorption of the glass substrate is not subtracted. Other optical properties of the film include: 92.3% transmission at 550 nm, a*(D65) 0.07 and b*(D65) 0.46. Refractive Index was 1.56 (at 632 nm) and final cured thickness 308 nm.

Application Example 20

The material of inventive example 20 was tested by characterizing the material on silicon wafer (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat:1 SEMI Standard) and spin coating was used as deposition method in this case. Spin coating at 2000 rpm was used as deposition process, pre-bake at 100° C. for 120 sec, Post-bake at 100° C. for 30 min. Film thickness was measured to be 3.1 μm and Refractive index 1.608 (at 632 nm).

Application Example 21

The material of inventive example 21 was tested by characterizing the material on silicon wafer (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat:1 SEMI Standard) and spin coating was used as deposition method in this case. Spin coating at 2000 rpm was used as deposition process, pre-bake at 100° C. for 120 sec, Post-bake at 100° C. for 30 min. Film thickness was measured to be 3.3 μm and Refractive index 1.613 (at 632 nm).

Application Example 22

The material of inventive example 22 was tested by characterizing the material on silicon wafer (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat:1 SEMI Standard) and spin coating was used as deposition method in this case. Spin coating at 2000 rpm was used as deposition process, pre-bake at 100° C. for 120 sec, Post-bake at 100° C. for 30 min. Film thickness was measured to be 6.1 μm and Refractive index 1.585 (at 632 nm).

Application Example 23

The material of inventive example 23 was tested by characterizing the material on silicon wafer (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat: 1 SEMI Standard) and spin coating was used as deposition method in this case. Spin coating at 2000 rpm was used as deposition process, pre-bake at 100° C. for 120 sec, Post-bake at 100° C. for 30 min. Film thickness was measured to be 6.1 μm and Refractive index 1.653 (at 632 nm).

Application Example 24

Figure 5:
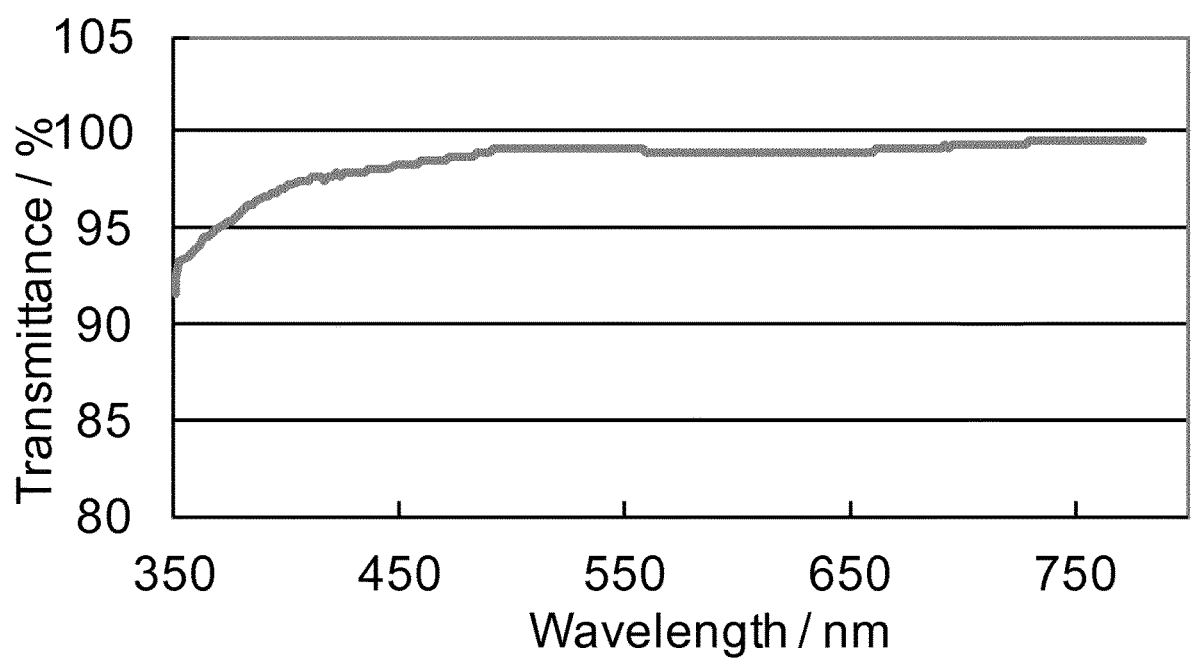
FIG. 5 shows the transmission graph of the film obtained in application example 24, (glass substrate subtracted).

The thin film coating material of inventive example 24 was deposited on S2003F3, from Matsunami Glass Ind., Ltd. by spin coating at 360 rpm for 30 seconds with a spin-coater, 1H-DX2, from Mikasa Co., Ltd., Japan. Pre-bake 100° C. 120 sec, Post-bake 250° C. 30 min. Film thickness was measured to be 200 nm and Refractive index 1.71 (at 632 nm). Then 1-bromonaphthalene from Wako Pure Chemical Industries, Ltd., Japan was additionally applied on the surface of the coating at the thickness of 58 um to eliminate thin film interference effect for the transmittance measurement and covered with same slide glass plate. FIG. 5 shows the transmission graph of the material. Other optical properties of the thin film include (substrate excluded): 99.1% transmission at 550 nm, a*(D65) −0.35 and b*(D65) 0.45.

Application Example 24A

The procedure of application example 24 was repeated except that the post bake step was performed four (4) times at 250° C. for 30 min with cooling to room temperature between each baking step.

Application Example 24B

The procedure of application example 24 was repeated except that the post bake step was performed at 250° for 30 min and subsequently at 350° C. for 30 min.

The results are given in the following table.

| | refractive index | Average Transmission (360-740 nm [%]) | Thickness [nm |
|---|---|---|---|
| Application example 24 | 1.71 | 96.8 | 463 |
| Application example 24A | 1.75 | 95.8 | 393 |
| Application example 24B | 1.87 | 92.2 | 301 |

In above table a summary is given on single bake and multi-bake cycle stability for the material. The refractive index varied from 1.71-1.87 when increasing the bake temperature, and film thickness decreased from 463 nm to 301 nm.

Furthermore, the outgassing of application example 24 was determined by Thermogravimetric analysis (TGA). The results are shown in FIG. 6 and summarized in the following table.

| Phase | weight change compared with t = 0 min [wt. %] | change vs. result of previous phase [wt. %] |
|---|---|---|
| 1 (after 60 min holding time at 160° C.) | 97.3 | −2.7 |
| 2 (after 60 min holding time at 230° C.) | 96.0 | −1.3 |

| Phase | weight change compared with t = 0 min [wt. %] | change vs. result of previous phase [wt. %] |
|---|---|---|
| 3 (after 30 min holding time at 250° C.) | 94.7 | −1.3 |

Figure 6:
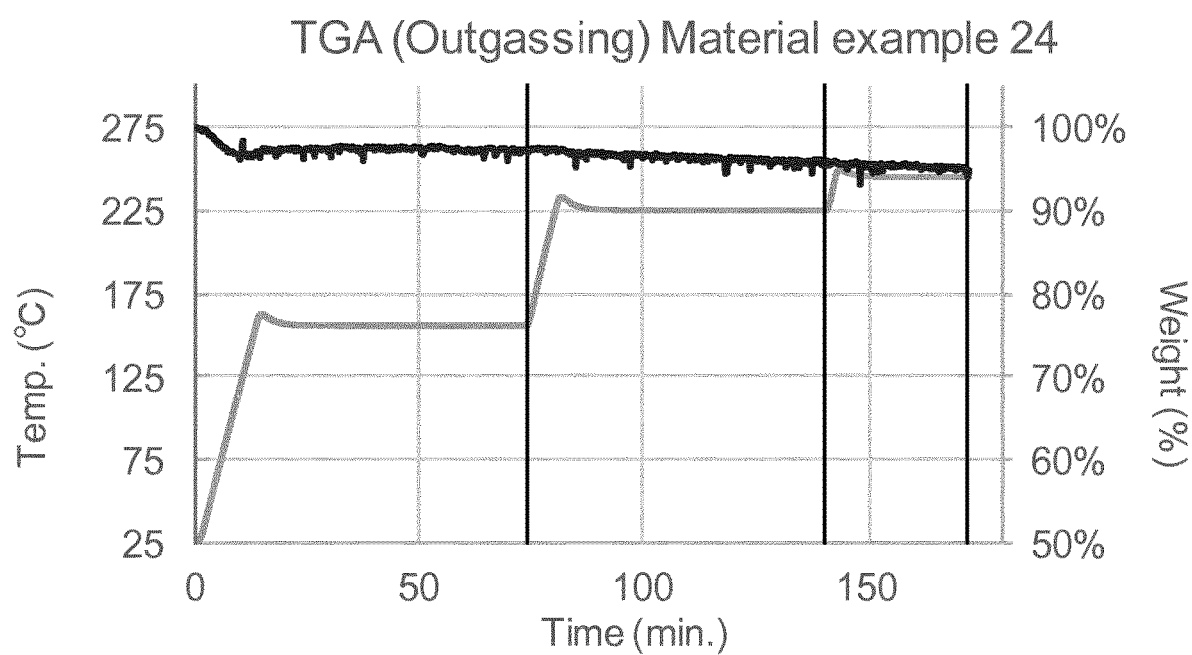
FIG. 6 shows the weight loss, determined by Thermogravimetric analysis (TGA) of application example 24

FIG. 6 and the table above show that the material has a low weight loss even under elevated temperatures determined by thermal gravimetry analysis (TGA) for the Example 24 material. The weight loss at 160° C. is attributed to the removal of trace amounts of water. After the removal of water, at 230° C. as well as at 250° C. no significant weight loss was observed. These are typical process temperatures in device fabrication. Thus, the inventive material generates no significant outgassing during production process.

Application Example 24C

The procedure of application example 24 was repeated except that the spin coating step was performed at 2000 rpm.
The thickness of the obtained films of application example 24 and application example 24C during the course of 23 weeks at +4° C. and +23° C. was determined. For application example 24 the differences in refractive index at +4° C. and +23° C. was also determined. The results are shown in the following tables.

Thickness of the film of application example 24 [nm]

|  | 0 days | 5 weeks | 10 weeks | 23 week |
|---|---|---|---|---|
| +4° C. | 458 | 452 | 422 | 467 |
| +23° C. | 458 | 424 | 440 | 451 |

Thickness of the film of application example 24C [nm]

|  | 0 days | 5 weeks | 10 weeks | 23 week |
|---|---|---|---|---|
| +4° C. | 223 | 214 | 200 | 218 |
| +23° C. | 223 | 196 | 202 | 215 |

Refractive index of the film of application example 24

|  | 0 days | 5 weeks | 10 weeks | 23 week |
|---|---|---|---|---|
| +4° C. | 1.710 | 1.707 | 1.710 | 1.71 |
| +23° C. | 1.710 | 1.709 | 1.707 | 1.70 |

The data in the tables above represent shelf-life stability data for the material of inventive example 24. Ready to use formulation shelf-life has been analyzed at +4° C. and +23°. Two different spin speed and resulting film thicknesses were analyzed in terms of film thickness consistency and refractive index consistency during the period of 23 weeks. From the data it can be confirmed that the material of inventive example 24 is very stabile at both ageing temperatures.

Application Example 25

The thin film coating material of inventive example 25 was deposited on Gorilla glass 4 by spin coating method. The material was characterized on glass substrate and spin coating was used as deposition method. Spin coating at 2000 rpm was used as deposition process, pre-bake 100° C. 120 sec, Post-bake 250° C. Film thickness was measured to be 56 nm and Refractive index 1.72 (at 632 nm). The only difference between Example 24 and 25 material is the further dilution of the material in case of sample 25 to result in thinner film.

Application Example 27

The thin film coating material of inventive example 26 was tested by characterizing the material on Gorilla Glas 4 and spin coating was used as deposition method in this case. Spin coating at 2000 rpm was used as deposition process, pre-bake at 100° C. for 120 sec, Post-bake at 250° C. for 30 min.

Application Example 28

The procedure of application example 27 was repeated except that inventive material 28 was used.
The results are shown in the following table

|  | Application example 27 | Application example 28 |
|---|---|---|
| thickness [nm] | 409 | 408 |
| refractive index (632 nm) | 1.71 | 1.71 |
| Δa* | −0.32 | 0.3 |
| Δb* (yellowing) | −0.45 | −0.74 |
| L* | 95.58 | 95.52 |
| transmission (400 nm) [%] | 87.89 | 87.04 |
| transmission (550 nm) [%] | 88.25 | 87.86 |

Application Example 28A

The thin film coating material of inventive example 28 was deposited on glass by ink-jet printing coating method. The material was characterized on Gorilla glass 4 and silicon wafers (Diameter: 150 mm, Type/Dopant: P/Bor, Orientation: <1-0-0>, Resistivity: 1-30 ohm·cm, Thickness: 675+/−25 μm, TTV: <5 μm, Particle: <20@0.2 μm, Front Surface: Polished, Back Surface: Etched, Flat: 1 SEMI Standard) and ink-jet coating was used as deposition method. Ink-jet printing (Dimatix Materials Printer DMP-2850; Jets 16, jetting frequency 5 kHz, applied voltage 20V, drop spacing 30 μm, cartridge type 10 pL) was used as deposition process, pre-bake at 100° C. for 120 sec, Post-bake at 250° C. for 30 minutes. Film thickness was measured to be 450 nm and Refractive index 1.71 (at 632 nm).

Application Example 28B and C

The thin film coating material of inventive example 28 was further modified by introducing scatter particles (TiO$_2$ with an average particle size of 200 nm, obtainable from Kronos) in to the material at two different concentrations. Application example 28B was prepared by adding 3.8 weight-% of the scatter particles by weight to the inventive example 28 formulation and application example 28C was prepared by adding 4.8 weight-% of the scatter particles into the inventive example 28 formulation. The thin film coating material of inventive example 28B and 28C were deposited on Gorilla glass 4 by spin coating method. Spin coating at 400 rpm was used as deposition process, pre-bake at 100° C. for 120 sec, Post-bake at 250° C. for 30 minutes. Film thickness was measured to be 400 nm. Other optical data of the two application examples listed in the below table.

|  | Application example 28B | Application example 28C |
|---|---|---|
| thickness [nm] | 400 | 400 |
| Haze | 15% | 18% |
| Δa* | 1.21 | 2.52 |
| Δb* (yellowing) | −0.72 | −0.47 |
| L* | 71.57 | 61.45 |
| transmission (400 nm) [%] | 50.59 | 36.10 |
| transmission (550 nm) [%] | 46.44 | 31.81 |

Comparative Example 1 (vs. Inventive Example 1-18

0.5 g of water, 24 g of propyleneglycolmonomethylether and 0.2g of triethylamine were placed in a round bottom flask and heated at 80° C. (oil bath). A mixture of 2.34 g of methacryloxypropylmethyldimethoxysilane and 5.2 g of tetraisopropylorthotitanat was added to the reaction mixture drop-wisely (3 min) at 80° C. Precipitates gradually generated during the addition and the solution became semi-transparent after addition of the mixture. The reaction mixture was stirred for 3 hours at 80C, giving a semi-transparent white dispersion. A film was not formed from this composition, because an opaque film will result.

The invention claimed is:

1. A process for preparing a thin film on a substrate, the process comprising:
   a) preparing a first precursor composition (FPC) in a first vessel, wherein a) comprises:
      a1) providing one or more metal or metalloid compound(s) according to the following formula (I)

$$M^1(OR^1)_n R^2_m \quad (I)$$

wherein
      $M^1$ is a metal or metalloid selected from the group consisting of Si, Ti, Zr, Ge, and Sb, with a valence z,
      each $R^1$ is independently a $C_1$ to $C_{10}$ organyl or organoheteryl group,
      each $R^2$ is independently a $C_1$ to $C_{20}$ organyl or organoheteryl group,
      n is 1 to z,
      m is z−1 to 0, and
      n+m is z; and
   a2) at least partially hydrolyzing the $M^1$ $(OR^1)$-moieties under acidic or basic conditions using a catalyst and polymerizing the one or more metal or metalloid compound(s) according to formula (I) to obtain a product having a molecular weight of 250 g/mol to 6000 g/mol,
   b) preparing a second precursor composition (SPC) in a second vessel, wherein b) comprises:
      b1a) providing a metal or metalloid compound according to the following formula (II)

$$M^2(OR^3)_o \quad (II)$$

wherein
      $M^2$ is a metal or metalloid selected from the group consisting of Si, Ge, Sb, Ti, Zr, Al, Sn, W, Se, Cr, Ag, and Ni, with a valence y, wherein $M^1$ and $M^2$ are based on different elements of the periodic table,
      each $R^3$ is independently a $C_1$ to $C_{10}$ organyl or organoheteryl group, and
      o is y; and
      b2a) optionally reacting the metal or metalloid compound according to formula (II) with a ligand (L) different from $(OR^3)$; or
      b1b) directly providing a reaction product of b2a);
   c) mixing the FPC comprising the product obtained in step a2) with the SPC comprising the product obtained in step b2a) or b2b);
   c1) optionally reacting a product of c) with $Si(R^{23})_3X$ or $Si(R^{23})_2X_2$, or wherein $R^{23}$ is a $C_1$-$C_3$ alkyl group, and X represents Cl or $OR^{24}$, wherein $R^{24}$ is a $C_1$-$C_3$ alkyl group;
   d) forming a thin layer on the substrate;
   e) optionally partially or completely removing solvent, if present, after d); and
   f) curing an intermediate product obtained in e), if present, or d), if e) is not present,
   wherein, optionally a (meth)acrylate ester (ME) is added during a),
   during b), and/or
   during c) or after c) before d) is effected.

2. The process of claim 1, wherein, in c), a molar ratio between $M^1$ and $M^2$ is from 1.0:10 to 10:1.0.

3. The process of claim 1, wherein, during c), an additive is added,
   wherein optionally the additive is selected from the group consisting of a surfactant, a levelling agent, a processing aid, an antistatic agent, an antioxidant, a water scavenger, an oxygen scavenger, a catalyst, a scatter particle, a photoinitiator and mixtures thereof.

4. The process of claim 1, wherein a maximum temperature during d) to f) is below 450° C.

5. The process of claim 1, further comprising, after c): c2) adding a solvent(S) to the mixture obtained in c).

6. The process of claim 1, wherein a solids content prior to d) is not more than 75 wt. %.

7. The process of claim 1, wherein a solids content prior to d) is at least 90 wt. %.

8. The process of claim 1, wherein f) is effected by thermal and/or radiation curing.

9. The process of claim 1, wherein $M^1$ is Si.

10. The process of claim 1, wherein $M^2$ is Ti and/or Zr.

* * * * *